United States Patent [19]
Jacobson et al.

[11] Patent Number: 6,044,402
[45] Date of Patent: Mar. 28, 2000

[54] NETWORK CONNECTION BLOCKER, METHOD, AND COMPUTER READABLE MEMORY FOR MONITORING CONNECTIONS IN A COMPUTER NETWORK AND BLOCKING THE UNWANTED CONNECTIONS

[75] Inventors: Douglas W. Jacobson; James A. Davis, both of Ames, Iowa

[73] Assignee: Iowa State University Research Foundation, Ames, Iowa

[21] Appl. No.: 08/887,044

[22] Filed: Jul. 2, 1997

[51] Int. Cl.[7] .................................................... G06F 13/00
[52] U.S. Cl. ........................... 709/225; 709/224; 709/227
[58] Field of Search ..................................... 709/217, 219, 709/218, 223, 225, 227, 228, 229, 250, 224; 713/201

[56] References Cited

U.S. PATENT DOCUMENTS

| | | | |
|---|---|---|---|
| 5,541,987 | 7/1996 | Topper et al. | 379/230 |
| 5,606,668 | 2/1997 | Shwed | 395/187.01 |
| 5,630,058 | 5/1997 | Mosley et al. | 395/187.01 |
| 5,699,513 | 12/1997 | Feigen et al. | 395/187.01 |
| 5,751,952 | 5/1998 | Dai et al. | 395/200.8 |
| 5,892,903 | 4/1999 | Klaus | 713/201 |

FOREIGN PATENT DOCUMENTS

WO 98/19250   5/1998   WIPO .

OTHER PUBLICATIONS

Halsall, "Data Communications, Computer Networks & Open Systems" Addison–Wesley 1995, pp. 641–693.

Been attached? Congratulations!, *Network Computing*, pp. 56, (Jan. 15, 1997).

*Primary Examiner*—Viet D. Vu
*Attorney, Agent, or Firm*—Flehr Hohbach Test Albritton & Herbert LLP

[57] ABSTRACT

A network connection blocker for monitoring connections between host computers in a network and blocking the unwanted connections. The host computers transmit connection packets between each other in accordance with a network protocol suite when seeking to establish, providing network services with, and close the connections. The network protocol suite includes a connection oriented transport layer protocol. The network connection blocker comprises a network interface that receives the connection packets transmitted between the host computers. It also comprises a blocking module that processes the received connection packets to detect the unwanted connections. The blocking module then generates connection packets in accordance with the network protocol suite to cause the detected unwanted connections to be closed by the corresponding host computers between which are the unwanted connections. The network interface then transmits the generated connection packets to these host computers.

15 Claims, 12 Drawing Sheets

TCP Port Number Table 142

| CP Port # | Application Layer Protocol | Network Service |
|---|---|---|
| 7 | Echo | Echo |
| 9 | Discard | Discard |
| 21 | FTP | File Transfer |
| 23 | Telnet | Telnet Login |
| 25 | SMPT | Mail Transfer |
| 79 | Finger | Finger Information |
| 80 | HTTP | World-Wide-Web |
| 110 | POP-3 | Post Office V.3 Mail Transfer |
| 119 | NNTP | Usenet |

Local Protocol Block List 206

| Blocked Local Protocols |
|---|
| Protocol C |
| Protocol A |
| ⋮ |

Remote Protocol Block List 204

| Blocked Local Protocols |
|---|
| Protocol C |
| Protocol D |
| ⋮ |

Figure 11

Blocking Override Table 208

| | Network Addresses of Remote/Local Host Computers | | | |
|---|---|---|---|---|
| | | Network Address X | Network Address Z | ... |
| Network Addresses of Local Host Computers | Network Address A | Blocking Policy N | Blocking Policy J | ... |
| | Network Address B | Blocking Policy M | Blocking Policy K | ... |
| | ⋮ | ⋮ | ⋮ | ⋮ |

Figure 12

NETWORK CONNECTION BLOCKER, METHOD, AND COMPUTER READABLE MEMORY FOR MONITORING CONNECTIONS IN A COMPUTER NETWORK AND BLOCKING THE UNWANTED CONNECTIONS

FIELD OF THE INVENTION

The present invention relates generally to systems and methods for providing network security to a computer subnet (i.e., sub-network) in a larger computer network, such as the Internet. In particular, it pertains to a network connection blocker and corresponding method that provides network security to such a subnet by passively monitoring connections between the subnet and the rest of the network and actively blocking those of the connections that are unwanted.

BACKGROUND OF THE INVENTION

The concept of a computer network has been revolutionized over the last decade. Computer networks have evolved from being independent entities that were limited to small geographic areas or single organizations into today's globally interconnected networks, such as the Internet. Thus, small and individual networks have become subnets of these larger networks. With this increased interconnectivity comes new and fascinating opportunities for these subnets, but also new dangers and security risks.

For example, much of the success of the Internet can be attributed to the TCP/IP protocol suite. It is the protocol suite that constitutes the Internet's foundation. The TCP/IP protocols allow for communication between host computers independent of their internal architectures. Because they are based on open standards, these protocols have become widely accepted even outside the Internet community.

The TCP/IP protocol suite has expanded and changed with the evolution of computer and communication technology in general, but it still has its roots in the 1960s and 1970s. The concept of a global network, like the Internet, was unthinkable back then. In particular, the overwhelming widespread use and amount of traffic as seen today was not contemplated. As a result, one of the basic limitations of the Internet is that the TCP/IP protocol suite does not have suitable provisions for handling unwanted traffic on a subnet of the Internet.

For example, in the early days of the Internet, subnets of the Internet were small and mostly limited to research communities. Issues other than security were more important in this environment. And, openness was regarded as a very favorable aspect of the TCP/IP protocol suite. This is in great contrast to today's Internet where subnets now require high levels of security as commerce and financial transactions have become major parts of the network traffic.

The best way to provide security to a subnet in order to protect its electronic resources or property is to completely isolate it from the rest of the world. But, this is seldom a desired and realistic option. Most network operators choose instead to protect subnets with devices, such as firewalls, which actively monitor and block the network traffic to and from the subnet. In doing so, these devices receive the network traffic and forward the allowed network traffic and do not forward the unwanted network traffic. However, because these types of devices are active participants in both monitoring and blocking the network traffic, they become bottlenecks and also are vulnerable to attack.

SUMMARY OF THE INVENTION

In summary, the present invention is a network connection blocker for monitoring connections between host computers in a network and blocking the unwanted connections. The host computers transmit connection packets between each other in accordance with a network protocol suite when seeking to establish, providing network services with, and close the connections. The network protocol suite includes a connection oriented transport layer protocol.

The network connection blocker comprises a network interface that receives the connection packets transmitted between the host computers. It also comprises a blocking module that processes the received connection packets to detect the unwanted connections. The blocking module then generates connection packets in accordance with the network protocol suite to cause the detected unwanted connections to be closed by the corresponding host computers between which are the unwanted connections. The network interface then transmits the generated connection packets to these host computers.

BRIEF DESCRIPTION OF THE DRAWINGS OF THE INVENTION

FIG. 11 shows a remote protocol block list and a local protocol block list that are included in the blocking data structure of the network connection blocker.

FIG. 12 shows a blocking override table that is included in the blocking data structure of the network connection blocker of FIG. 8.

DETAILED DESCRIPTION OF THE INVENTION

Figure 1:
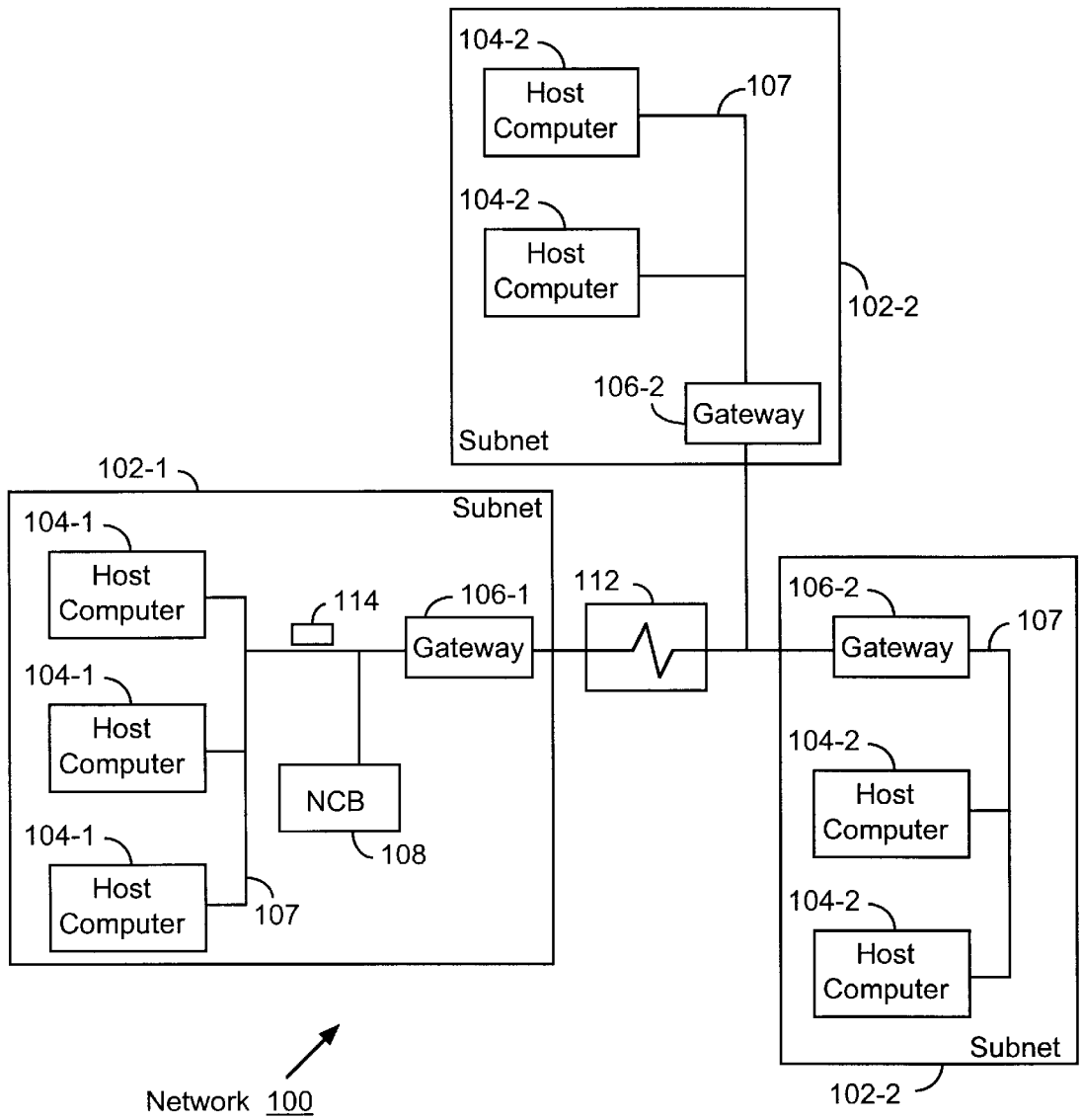
FIG. 1 is a block diagram of a computer network having a protected subnet protected by a network connection blocker in accordance with the present invention.

Referring to FIG. 1, there is shown an exemplary embodiment of a large computer network 100, such as the Internet, with subnets 102 that include host computers 104. The subnets include a protected subnet 102-1 that is protected with an NCB (network connection blocker) 108 and remote subnets 102-2 that are remotely connected to the protected subnet. The host computers include local host computers 104-1 that are within the protected subnet and remote host computers 104-2 that are within the remote subnets.

The local host computers 104-1 are connected locally to each other with and communicate locally with each other over the communications lines 107-1 of the protected subnet 102-1. Similarly, the remote host computers 104-2 in each remote subnet 102-2 are connected locally to each other with and communicate locally with each other over the communications lines 107-2 of the remote subnet. And, the local and remote host computers and are connected remotely and communicate remotely with each other. This is done via gateways 106 and communication links 112 of the network. The gateways include a local gateway 106-1 that is in the protected subnet and is connected to the local host computers by the communications lines of the protected subnet and is also connected to the communications links. The gateways also include remote gateways 106-2 that are each in a corresponding remote subnet. Each remote gateway is connected to the communications links and the remote host computers in the corresponding remote subnet by the communications lines 107 of the remote subnet.

The host computers 104 in the network 100 communicate with each other using packets 114. These packets are used to establish connections between the host computers, perform network services over these connections, and close these connections in accordance with a network protocol suite used in the network 100. In the case where two host computers within a subnet 102 communicate with each other, the packets are simply transmitted between these host computers over the communications lines 107 of the subnet. But, in the case where host computers in different subnets communicate with each other, the packets are routed between these host computers with the gateways 106, the communications links 112, and the communication lines 107 of the subnets.

As indicated earlier, the protected subnet 102-1 includes an NCB 108 that is connected to the protected host computers 104-1 and the local gateway 106-1 within the subnet 102 by the communications lines 107 of the subnet. The NCB receives all of the packets 114 transmitted between the protected host computers 104-1 within the protected subnet 102-1 and all of the packets 114 transmitted between the protected and remote host computers 104-1 and 104-2. In doing so, the NCB passively monitors all of the connections between the protected host computers and all of the connections between the protected and remote host computers. And, it actively blocks those of the connections that are not wanted by transmitting packets to the host computers that form the unwanted connections to cause these computers to close the unwanted connections. This is done in accordance with the network protocol suite used in the network.

In order to understand the operation of the NCB 108, the network protocol suite and the manner in which the network protocol suite is used to establish, provide network services over, and close connections between the protected host computers 104-1 and between the protected and remote host computers 104-1 and 104-2 will be discussed first. Then, the configuration, the blocking operation, and the local and remote management of the NCB will be discussed. For this document, when one of the host computers requests that a connection be made with another one of the host computers, then the host computer that issues the request will be considered to be the client and the host computer that receives the request will be considered to be the server for the duration (or life) of the connection. The duration of the connection includes the establishment, the providing of a network service over, and the closing of the connection.

Network Protocol Suite

Figure 2:
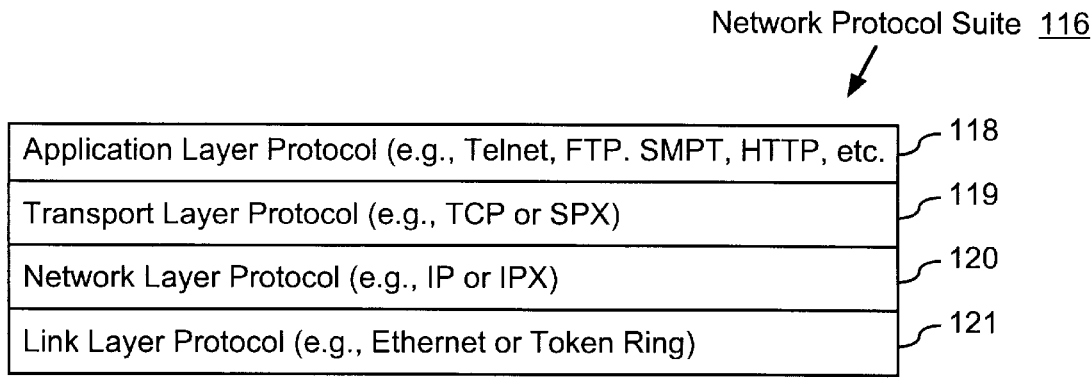
FIG. 2 shows the network protocol suite used in the network.

Referring to FIG. 2 and as just mentioned, packets 114 may be generated and transmitted between the host computers 104 according to a network protocol suite 116, such as a TCP/IP or an IPX/SPX protocol suite. The network protocol suite includes application layer (or level) protocols 118, such as Telnet, FTP (File Transfer Protocol), SMTP (Simple Mail Transfer Protocol), HTTP (Hyper Text Transfer Protocol), or other similar protocols (see FIG. 5), for performing network services at an application layer with the host computers using the packets. It also includes a transport layer protocol 119 which may be connection oriented, such as TCP (Transmission Control Protocol) or SPX (Sequenced Exchange), or may be connectionless oriented, such as UDP (User Datagram Protocol). The transport layer protocol ensures that the packets are reliably transmitted at a transport layer between the host computers. And, the network protocol suite includes a network layer protocol 120, such as IP (Internet Protocol) or IPX (Internet Packet Exchange), for routing the packets at a network layer between the host computers. Finally, it includes a link layer protocol 121, such as Ethernet or Token Ring, for physically providing the packets to the host computers at a link layer.

Furthermore, in order to generate and transmit the packets 114 according to the network protocol suite 116, each of the host computers 104 includes a network protocol stack. The network protocol stack of each host computer provides an interface with an application that runs on the host computer for accessing applications running on other host computers of the network 100. This interface is conducted at the application, transport, network, and link layers using the corresponding application, transport, network, and link layer protocols in the following manner.

Transport Layer

Figure 3:
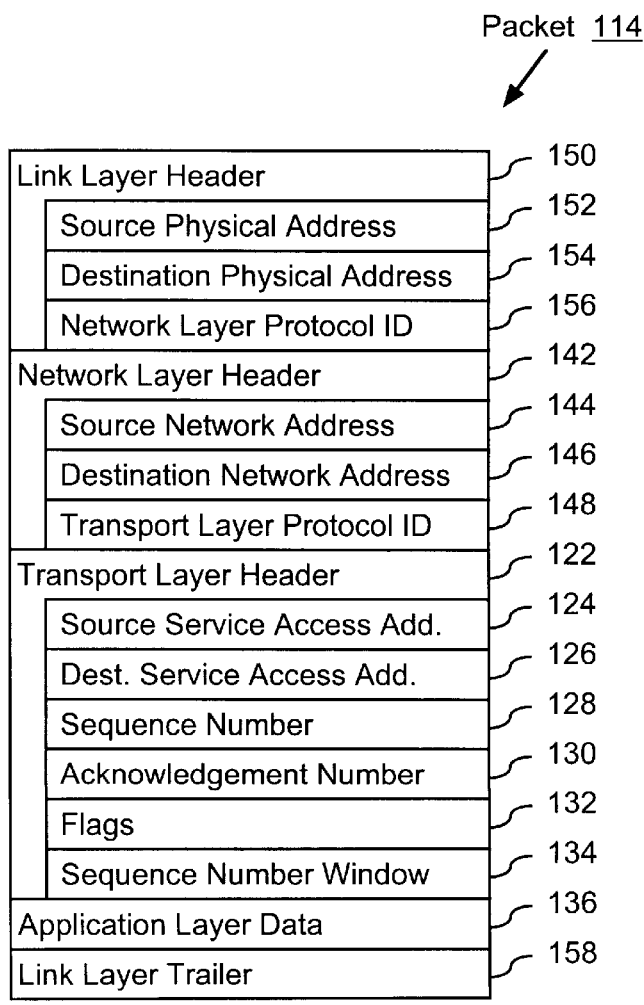
FIG. 3 shows the composition of each packet transmitted between host computers in the network.

At the transport layer, a transport layer header 122 is attached to each packet 114, as shown in FIG. 3, according to a transport layer protocol 119. In the case where the transport layer protocol is connection oriented, the transport layer headers in the packets transmitted between two of the host computers 104 are used to establish, perform network services over, and close a connection between these host computers 104, as will be described shortly.

In the case of a connection oriented transport layer protocol 119, the transport layer header 122 in each packet 114 transmitted by a host computer 104 contains a sequence number 128, an acknowledgment number 130, one or more flags 132, and a sequence number window (i.e., allocation number) 134, as shown in FIG. 3. The sequence number is the sequence number of the packet in the sequence that it is transmitted by the host computer. The sequence number window is the window (i.e., range or allocation) of the sequence numbers of the packets transmitted by the host computer. The acknowledgment number is the acknowledgment number that acknowledges the sequence number of a packet received by the host computer from another host computer. And, the flags are flags that are used for establishing, performing network services over, and closing a connection between these host computers. In order to establish, perform network services over, and close such a connection, the network protocol stacks of these host computers appropriately set the sequence number, the acknowledgment number, the flags, and the sequence number window in the packets that they transmit between each other according to the transport layer protocol 119.

Figure 4:
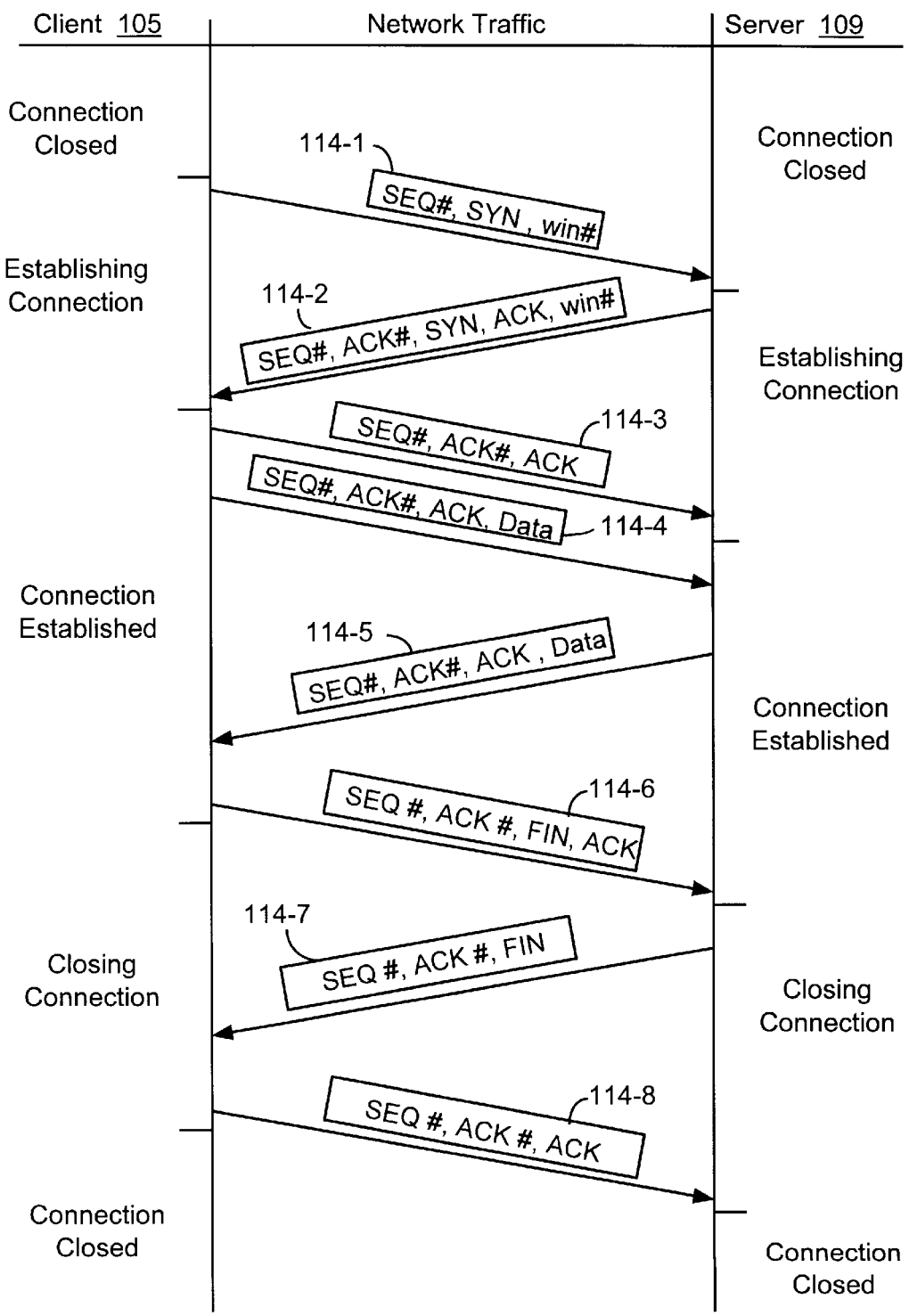
FIG. 4 shows how packets are transmitted according to the TCP protocol in a connection between a client and server.
Figures 5, 6:
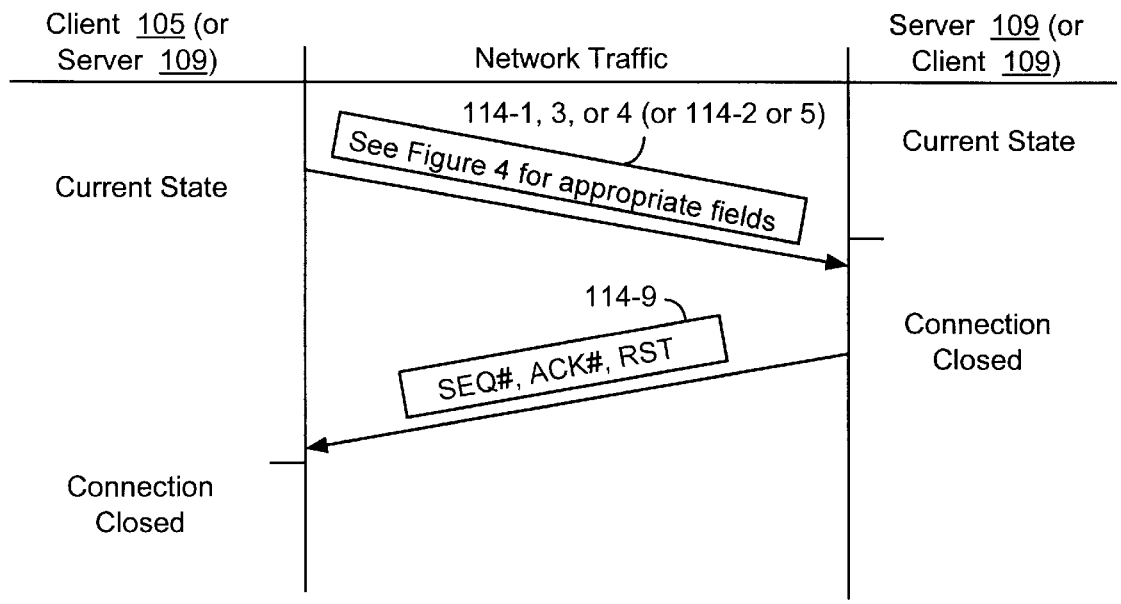
FIG. 5 shows how a connection between a client and server is reset according to the TCP protocol.
FIG. 6 shows a table of some well known TCP port numbers.

FIGS. 4 and 5 show how a connection between two of the host computers 104 is established and used to provide network services according to the TCP protocol. As alluded to earlier, one of the host computers is a client 105 and the other is a server 109 and the connection has one endpoint at the client and the other endpoint at the server. The client and the server transmit connection packets 114-1 to 114-9 between each other to establish, provide network services over, and close the connection. In order to establish the connection, a connection establishing handshake is conducted with connection establishing packets 114-1 to 114-3 transmitted between the client and the server. And, to provide a network service between the client and the server, one or more connection service packets 114-4 and 114-5 are then used. And, to close the connection, a connection closing handshake is conducted with connection closing packets 114-6 to 114-8. Finally, a connection reset packet 114-9 can also be used to close the connection.

Turning to FIG. 4, prior to the connection establishing handshake, the client 105 is initially in a connection closed (i.e., sleeping) state. In this state, an application running on the client has not yet requested establishment of a connection with the server 109. Similarly, the server is in a connection closed (i.e., listening) state prior to the handshake where the corresponding application that runs on the server and interfaces with the network protocol stack of the server passively listens for a request to establish a connection.

Then, when the application running on the client 105 requests establishment of a connection with the server 109, the network protocol stack of the client generates a first connection establishing packet 114-1 for requesting the establishment of the connection. Specifically, the network protocol stack attaches at the transport layer an appropriate transport layer header 122 to this packet in accordance with the TCP protocol. The sequence number (SEQ#) 128 of the packet in the transport layer header is the initial sequence number of the packets that will be transmitted by the client. The sequence number window (win#) 134 in the transport layer header is the sequence number window of the packets transmitted by the client. Furthermore, the flags 132 in the transport layer header include a synchronize (SYN) flag for synchronizing the sequence numbers of the client and server. The packet is then transmitted by the client to the server. Thus, the client moves from the connection closed state to an establishing connection (or synchronizing) state.

When the server 109 receives this first connection establishing packet 114-1, it is in a connection state and its network protocol stack generates a second connection establishing packet 114-2 that acknowledges receipt of the request. Thus, at the transport layer, the network protocol stack of the server attaches a transport layer header 122 to the packet in accordance with the TCP protocol. The sequence number 128 in the transport layer header is the initial sequence number of the packets that will be transmitted by the server. The sequence number window 134 of the packet's transport layer header is the sequence number window of the packets transmitted by the server. And, the acknowledge number 130 in the packet's transport layer header acknowledges the sequence number of the first connection establishing packet. Furthermore, the flags 132 in the packet's transport layer header include the synchronize flag for synchronizing the sequence numbers of the packets transmitted by the client and the server. These flags also include an acknowledge (ACK) flag to acknowledge that the acknowledge and sequence numbers in the transport layer header are valid. The packet is then transmitted by the server to the client 105. As a result, the server moves from the connection closed state to an establishing connection state.

The client 105 then receives the second connection establishing packet 114-2. In response, the network protocol stack of the client generates a third connection establishing packet 114-3 that acknowledges that the sequence numbers of the packets transmitted by the client and sever 104-2 are synchronized. In doing so, the network protocol stack, at the transport layer, attaches to the third connection establishing packet a transport layer header 122 in accordance with the TCP protocol. The sequence number 128 of the packet in the packet's transport layer header follows the sequence number of the first connection establishing packet 114-1 transmitted by the client. The acknowledge number 130 in the packet's transport layer header acknowledges the sequence number of the second connection establishing packet. Furthermore, the flags 132 in the packet's transport layer header include the acknowledge flag. The packet is then transmitted by the client to the server. As a result, the client moves from the establishing connection state to a connection established state.

When the server 109 receives the third connection establishing packet 114-3, the network protocol stack of the server then verifies at the transport layer that the acknowledge number 130 in the packet's transport layer header 122 acknowledges the sequence number 128 of the second connection establishing packet. As a result, the server moves from the establishing connection state to a connection established state and the handshake is complete.

Once the handshake is competed, the applications running on the client 105 and the server 109 will interface with the corresponding network protocol stacks in order to perform a network service (i.e., data transfer) using the application layer protocol 118 at the application layer. This is done with one or more connection service packets 1144 and 114-5 in the manner described in the section covering the application layer.

Furthermore, in order to close the connection, the sequence number 128, the acknowledge number 130, and the flags 132, of the transport layer header 122 in each packet 114 that is used for this purpose are appropriately set by the network protocol stack of the host computer 104 that transmits this packet. This is done in accordance with the transport layer protocol 119. And, in the TCP protocol, this may be done in two ways.

For example, the connection between the client 105 and the server 109 can be closed by using the finish (FIN) Flag of the TCP protocol. This is the normal way in which the connection is closed and involves a handshake between the client and the server at the transport layer. Furthermore, it can be initiated by either the client or the server.

Specifically, in the case where the client 105 initiates closure of the connection, the client is initially in the connection established state. Then, the application running on the client requests that the connection be closed. In response, the network protocol stack of the client generates a first connection closing packet 114-6 that indicates that the endpoint of the connection at the client is being closed. To do so, the network protocol stack of the client attaches at the transport layer an appropriate transport layer header 122 to the packet in accordance with the TCP protocol. The sequence number 128 of the packet in the transport layer header follows the sequence number of the previous connection service packet 1144 transmitted by the client. And, the acknowledge number 130 in the transport layer header acknowledges the sequence number of the previous connection service packet. The flags 132 in the transport layer header include the finish flag and the acknowledge flag. The packet is then transmitted by the client to the server 109 and the client moves from the connection established state to a closing connection state.

When the server 109 receives this first connection closing packet 114-6, the network protocol stack of the server generates a second connection closing packet 114-7 that acknowledges receipt of the request to close the connection and indicates that the endpoint of the connection at the server is being closed. Thus, at the transport layer, the network protocol stack of the server attaches a transport layer header 122 to the packet in accordance with the TCP protocol. The packet's sequence number 128 in the packet's transport layer header follows the sequence number of the previous connection service packet 114-5 transmitted by the server. And, the acknowledge number 130 in the packet's transport layer header acknowledges the sequence number of the first connection closing packet. Furthermore, the flags 132 in the packet's transport layer header include the acknowledge and finish flags. The packet is then transmitted by the server to the client 105. As a result, the server moves from the connection established state to the closing connection state.

The client 105 then receives the second connection closing packet 114-7. In response, the network protocol stack of the client generates a third connection closing packet 114-8 that acknowledges receipt of the second connection closing packet. In doing so, the network protocol stack, at the transport layer, attaches to the third connection closing packet a transport layer header 122 in accordance with the TCP protocol. The packet's sequence number 128 in the packet's transport layer header follows the sequence number of the first connection closing packet. Similarly, the acknowledge number 130 in the packet's transport layer header acknowledges the sequence number of the third connection closing packet. And, the flags 132 in the packet's transport layer header include the acknowledge flag. The packet is then transmitted by the client to the server. As a result, the client moves from the closing connection state to a connection closed state.

When the server 109 receives the third connection closing packet 114-8, the network protocol stack of the server then verifies at the transport layer that the acknowledge number 130 of the packet's transport layer header 122 acknowledges the sequence number 128 of the third connection closing packet 114-9. As a result, the server moves from the closing connection state to the connection closed state and the connection between the client and the server is closed.

However, as indicated earlier, the client 105 may also initiate the closing of the connection. In this case, the closing process is the same as that just described except that the client and the server are switched.

As mentioned earlier, the connection between the client 105 and the server 109 can also be closed with a packet 114 that causes the connection to be reset. For example, referring to FIG. 5, this may done using the reset (RST) flag of the TCP protocol when one of the host computers 104 that is the client or the server in the connection crashes and is rebooted so that it knows nothing of the connection that existed at the time of the crash. In this case, the host computer must initiate a reset. Thus, when one of the packets 114-1 to 114-8 is received by this host computer, it must transmit a connection reset packet 114-9 to the other host computer in the connection to indicate that the connection must be reset.

More specifically, in the case where the server 109 initiates the reset, it will have moved from its current state, which may be the establishing connection state or the connection established state, to the connection closed state. Furthermore, it may have received one of the packets 114-1, 114-3, 114-4, 114-6, or 114-8 from the client 1 05 after having moved to the connection closed state. In response, the network protocol stack of the server generates in response a connection reset packet 114-9 requesting reset of this connection.

In doing so, the network protocol stack of the server 109 attaches at the transport layer a transport layer header 122 to the connection reset packet 114-9 in accordance with the TCP protocol. If the first connection establishing packet 114-1 was the first packet received from the client 105 after the server moved to the connection closed state, then the acknowledge number 130 in the transport layer header of the connection reset packet is equal to the sequence number 128 in the first connection establishing packet's transport layer header. But, if the packet received from the client is one of the other packets 114-3, 114-4, 114-6, or 114-8 the sequence number 128 in the connection reset packet's transport layer header is equal to the acknowledge number 130 in the received packet's transport layer header. And, in either case, the flags 132 in the transport layer header include the reset flag for resetting the connection and an acknowledge flag. The connection reset packet is then transmitted by the server to the client.

In response to receiving the connection reset packet 114-9, the network protocol stack of the client 105 processes the packet. In the case where the connection reset packet is transmitted by the server in response to receiving the first connection establishing packet 114-1, the network protocol stack of the client determines at the transport layer whether the acknowledge number 130 of the connection reset packet's transport layer header 122 is equal to the sequence number 128 in the transport layer header of the first connection establishing packet. If so, it closes the connection with the server in response to the reset flag of flags 132 in the connection reset packet's transport layer header 122. But, in the case where the connection reset packet is transmitted by the server in response to receiving the packet 114-3, 114-4,114-6, or 114-8, the network protocol stack determines at the transport layer whether the sequence number 128 in the connection reset packet's transport layer header is within the sequence number window 134 in the transport layer header of the second connection establishing packet 114-2 received earlier from the server. If it is, then the network protocol stack closes the connection with the server in response to the reset flag. In either case, the server moves from its current state, namely the establishing connection state or the connection established state, to the connection closed state.

In the other case, where the client 105 initiates the reset and has moved from its current state, either the connection establishing state or the connection established state, to the connection closed sate, the process just described is similar. Here, however, the connection reset packet 104-9 will be generated in response to receiving one of the packets 114-2, 114-5, or 114-7 received from the server 109 so that the sequence number 128 in the connection reset packet's transport layer header is equal to the acknowledge number 130 in the received packet's transport layer header. Otherwise the process is the same as that just described except that the client and the server are switched.

Additionally, referring to FIG. 3, in a connection made using the transport layer protocol 119, the connection between two host computers 104 is established between service access addresses (i.e., ports, sockets or connections) on the host computers. Thus, the transport layer header 122 attached to each packet 114 that is transmitted between these host computers includes a source service access address 124 and a destination service access address 126. The source service access address identifies the service access address on the host computer that is the source of the packet and the destination service access address identifies the service access address on the host computer that is the destination of the packet.

In accordance with the transport layer protocol 119, the network protocol stack of each of the host computers 104 includes and stores a service access address table for the service access addresses that can be used on a server. This table identifies well known and predefined service access addresses for corresponding network services that can be provided by the server at the application layer with connections between a client and a server using the transport layer protocol at the transport layer. For most network services, there is a corresponding application layer protocol 118 at the application layer. Thus, the service access address on the server will identify the application layer protocol used in the connection. For example, the TCP protocol uses a TCP service access address number table that identifies well known and predefined service access address numbers used with connections made according to the TCP protocol at the service access address layer. These well known service access address numbers are used to provide corresponding network services at the application layer according to corresponding application layer protocols.

Thus, the service access address used on the client 105 can be arbitrarily chosen since the server 109 will get the client's service access address from the source service access address 124 in the transport layer header 122 of the first synchronization packet 114-1 transmitted by the client to the server. But, the service access address used on the server will have a well known service access address, such as one of the well known TCP port numbers in the TCP port number table 142 of FIG. 6, and will define the application layer protocol used in the connection.

Thus, the network protocol stack of the client 105 will set the source service access address 124 in the transport layer headers 122 of the packets 114 it transmits to the service access address chosen to be used on the client. And, the network protocol stack of the client also sets the destination service access address 126 in these packets' transport layer headers to the well known service access address that is used on the server. The server's service access address is obtained from the well known service access address table stored by the network protocol stack. Similarly, for the packets transmitted by the server, the network protocol stack of the server will set the destination and source service access addresses in these packets' transport layer headers to respectively the source and destination service access addresses in the transport layer headers of the packets received from the client.

Application Layer

Referring to FIG. 3, in order to perform a network service over a connection between two of the host computers 104, application layer data 136 in each packet 114 is attached by the network protocol stack of the host computer that transmits the packet. The application layer data in each packet is generated by the application running on the host computer for performing the network service. The network protocol stack of the host computer attaches the application layer data to the packet in accordance with the application layer protocol.

For example, in the connection in FIG. 4 made with the TCP protocol, the requested network service may be a file transfer from the server 109 to the client 105 using the HTTP protocol and may be requested by an application running on the client 105. As a result, the network protocol stack of the client generates a first connection service packet 1 144 after the connection has been established that requests this network service. In particular, at the application layer, the network protocol stack attaches application layer data 136 to the packet which includes a GET command generated by the application for requesting the transfer of the file in accordance with HTTP. The GET command is in the form of GET//host/path/filename.extension. The packet is then transmitted by the client to the server.

When the server 109 receives the first connection service packet 114-4, the network protocol stack of the server generates a second connection service packet 114-5 after the connection has been established that transfers the requested file. Specifically, at the application layer, the network protocol stack provides the application running on the server with the GET command in the first connection service packet's application layer data 136. In response, the application retrieves the requested file in the form of host/path/filename.extension for transferring the file to the client 105. The network protocol stack then attaches the application layer data 136 to the packet so that it includes the requested file. The packet is then transmitted by the server to the client.

In response to receiving the second connection service packet 114-5, the network protocol stack of the client 105 processes the packet for use by the application running on the client. Specifically, at the application layer, the network protocol stack provides the application running on the client with the requested file in the packet's application layer data 136. Then, in response, the application stores the requested file on the client so that it has been transferred to the client.

As another example, the requested network service by an application running on the client 105 may be a file transfer from the client to the server 109 in accordance with FTP. In this case, after the connection has been established between the client and the server, the network protocol stack of the client generates a single connection service packet 114-4 that requests and performs this transfer. In particular, at the application layer, the network protocol stack attaches application layer data 136 to the packet so that it includes the file to be transferred. The application layer data also includes a STOR command that, in accordance with the FTP, instructs the server to store the file. The STOR command is in the form of STOR/host/path/filename.extension. The packet is then transmitted by the client to the server.

In response to receiving the connection service packet 114-4, the network protocol stack of the server 109 processes the packet for use by the application running on the server. Specifically, at the application layer, the network protocol stack provides the application running on the server with the STOR command and the transferred file in the packet's application layer data 136. Then, in response to the STOR command, the application stores the transferred file on the server so that it has been transferred from the client to the server.

Network Layer

Each host computer 104 in the network 100 includes a global network address in accordance with the network protocol 120 that uniquely identifies it from all other host computers in the network. In order to properly route the packets 114 between the host computers 104 that are their initial sources and final destinations, a network layer header 142, as shown in FIG. 3, is attached to each packet by the network protocol stack of the host computer that is its source. This is done at the network layer in accordance with the network layer protocol 120.

The network layer header 142 in each packet 114 contains a source address 144, a destination address 146, and a transport protocol (i.e., packet type) ID (identifier) 148, as shown in FIG. 3. Thus, the network protocol stack of the initial source of each packet sets the source address to be the network address of the initial source and sets the destination address to be the network address of the final destination of the packet. And, the network protocol stack of the initial source also sets the transport protocol ID to identify the transport protocol that is being used in the connection between the client and the server.

As indicated earlier, the service access address of the host computer 104 that is the server in a connection identifies the application layer protocol used in the connection. Furthermore, the service access address and the network address of the client in the connection identifies one endpoint of the connection and the service access address and network address of the server identifies the other endpoint of the connection. Thus, the service access addresses and the network addresses of the client and the server comprise a connection information set that uniquely identifies the connection, its endpoints, and the application layer protocol used in the connection. For example, in the connection of FIGS. 4 to 6, the TCP/IP protocol suite may be used so that the network layer protocol is the IP protocol and the transport protocol is the TCP protocol. In this case, the client 105 and the server 109 have IP addresses and TCP port numbers that identify the connection, its endpoints, and the application layer protocol used in the connection.

Link Layer

Furthermore, in order to route packets 114 between physical locations, a link layer header 150 and a link layer trailer 158, as shown in FIG. 3, are attached to each packet by the network protocol stack of the last source of the packet. This is done at the link layer in accordance with the link layer protocol 121. Moreover, each element in a subnet 102, such as a host computer 104, an NCB 108, and a gateway 106, has a physical address that uniquely identifies it from any other element in the subnet. Thus, the link layer header 150 in each of the packets 114 includes a source physical address 152, a destination physical address 154, and a network layer protocol ID 156.

The network protocol stack of the host computer 104 that is the initial source of a packet sets the network protocol ID 156 to identify the network layer protocol that is used in the connection between this host computer and another host computer. This network protocol stack also sets the source physical address 152 to the physical address of the initial source. And, the network protocol stack of the initial source sets the destination physical address 154 to the physical address of the next destination of the packet in the manner described next.

In order to determine the destination physical address 154, the network protocol stack of each host computer 104 includes and stores routing information. The routing information identifies the network addresses of those of the final destinations to which packets are to be routed locally. These final destinations are the host computers that are on the same subnet 102 as the host computer that is the source of the packets. Moreover, the routing information identifies those of the network addresses of final destinations to which packets are to be routed remotely with the gateway 106 of the subnet. These final destinations are the host computers that are outside of the subnet on which the computer that is the initial source of the packets is located. In addition, the routing information provides a mapping of the network addresses to physical addresses of the host computers to which packets are to be routed locally. And, it provides the physical address of the gateway with which packets are to be routed remotely.

Thus, for each packet 114 transmitted by an initial source, the network protocol stack of the initial source determines from the routing information and the destination network address 146 in the packet's network layer header 142 whether to route the packet to its final destination locally or remotely via the gateway 106 of the subnet 102 in which the initial source is located. If the packet is to be routed locally to its final destination, the network protocol stack obtains the physical address of the final destination from the routing information and sets the destination physical address 154 in the packet's link layer header 150 with this physical address. But, if the packet is to be routed remotely to its final destination via a gateway, the network protocol stack obtains the physical address of the gateway from the routing information and then sets the destination physical address field in the packet's link layer header to the physical address of the gateway.

Then, each packet 114 is transmitted from the initial source with the physical source address 152 to the destination with the destination physical address 154. In the case where the destination physical address is on the same subnet 102 as the initial source, the packet will be directly received by the final destination with the destination physical address over the communications lines 107 of the subnet. However, in the case where the destination physical address is the physical address of the gateway 106 of the subnet, the packet will be first received by the gateway over the communications lines. Then, using its own routing information, the gateway would strip the link layer header and trailer 158 and route the packet to the communications links 112 based on the destination network address in the packet's network layer header 142. The gateways, routers, and/or bridges of the communications links would then similarly route the packet to the gateway of the subnet on which the final destination is located. This gateway then uses its routing table to identify the destination physical address from the destination network address in the packet's network layer header. It then attaches a link layer header and trailer to the packet with the source physical address in the link layer header set to the physical address of the gateway and the destination physical address in the link layer header set to the physical address of the final destination. The gateway then transmits the packet to the final destination over the communications lines of the subnet.

The NCB 108 uses the foregoing described properties and characteristics of the way in which connections between host computers 104 are established, provide network services, and are closed. It does so in order to monitor these connections and block those of the connections that are not wanted. This is done in the manner described next.

Figure 7:
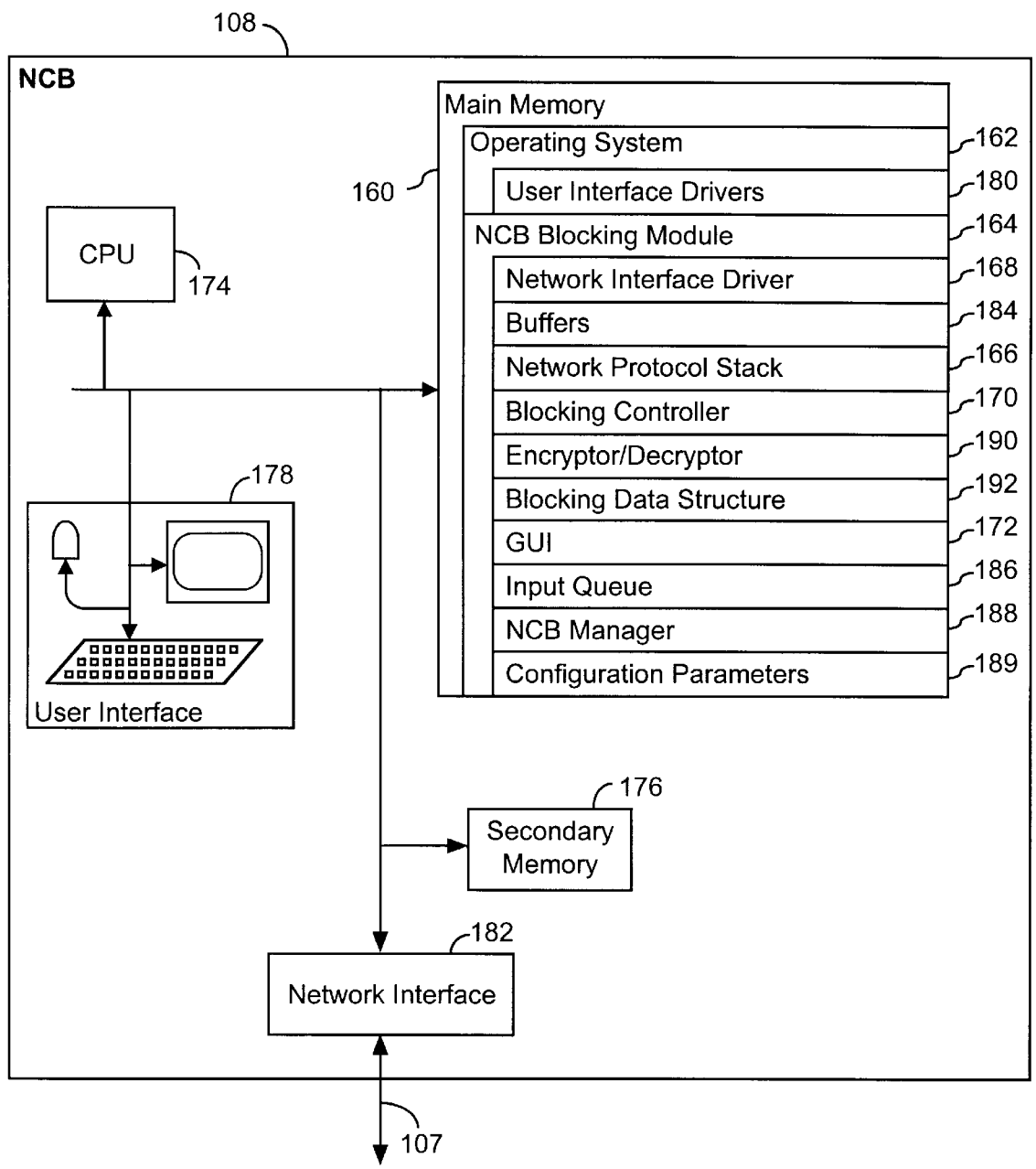
FIG. 7 shows the configuration of the network connection blocker.

Referring to FIG. 7, the NCB 108 comprises a computer that includes a memory 160 that stores an operating system 162 and an NCB blocking module 164. The NCB blocking module comprises a set of routines including a network protocol stack 166, a network interface driver 168, a blocking controller 170, a GUI (graphical user interface) 172, and an NCB manager 173. The operating system and the routines of the NCB blocking module are run on the CPU 174 of the NCB and may be loaded from the secondary memory system 176 of the NCB. The operating system controls and coordinates running of the routines of the NCB blocking module.

As will be described shortly in greater detail, the user interface 178 of the NCB 108 may be used by the user in conjunction with the GUI 172, the NCB manager 188, and the user interface drivers 180 of the operating system 162 to configure the NCB and control its operation. And, the network interface 182 of the NCB provides, in conjunction with the network interface driver 168, the buffers 184, and the queue 186 of the NCB blocking module 164, an interface for transmitting and receiving packets 114 to and from the network 100.

In addition, the NOB blocking module 164 includes a blocking data structure 190. The blocking data structure is used by the blocking controller 170 to determine which of the connections between the protected host computers 104-1 and between the protected and remote host computers 104-1 and 104-2 is to be blocked.

Blocking Operation of NCB

Figure 8:
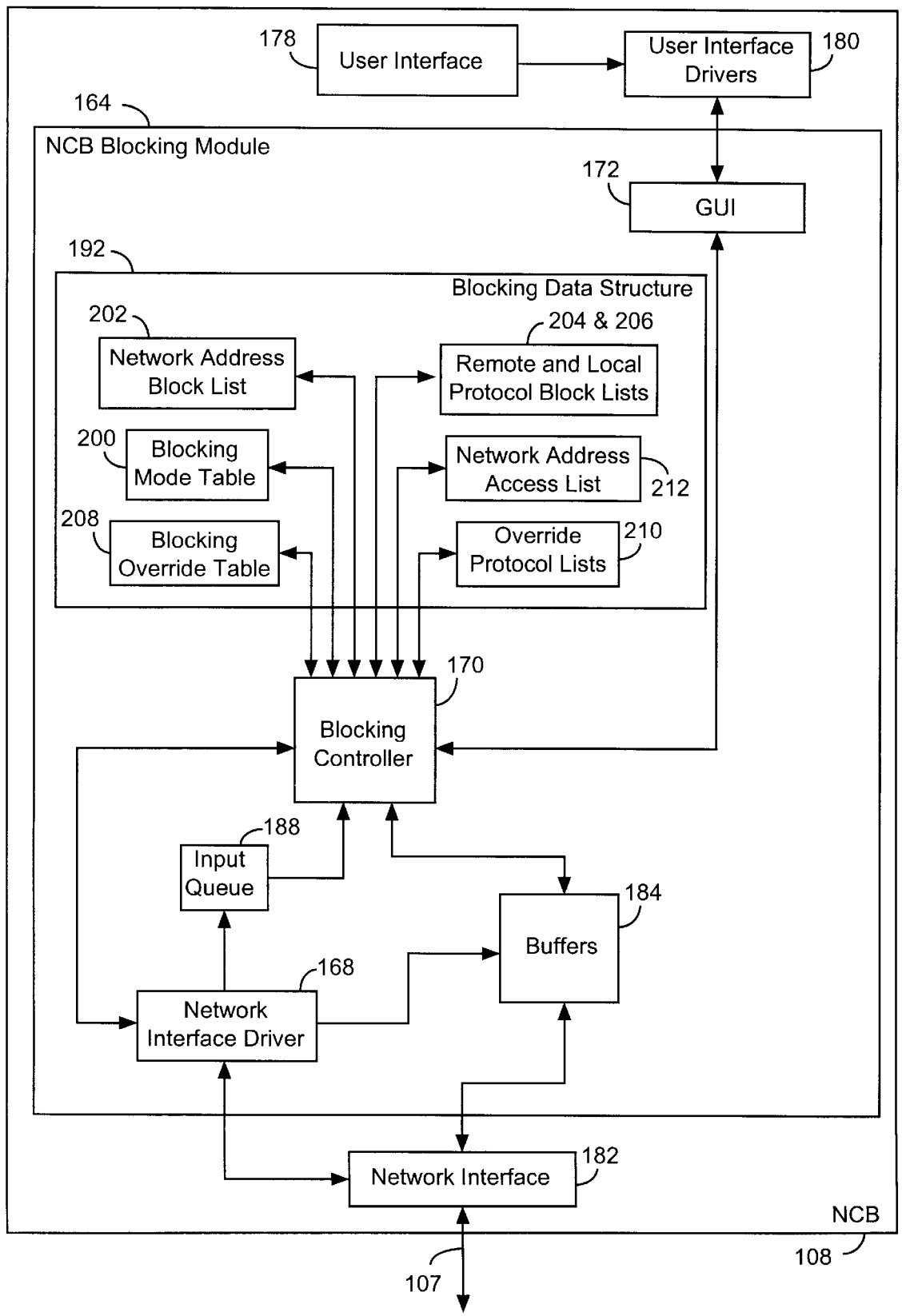
FIG. 8 shows the operation of the network connection blocker.

Referring now to FIG. 8, the GUI 172 of the NCB blocking module 164 is displayed by the user interface 178. In order to operate the NCB 108, the user issues commands with the user interface 178 and the GUI 172 to run the NCB blocking module. The user interface drivers receive these commands and provide them to the GUI. The GUI then opens the blocking controller 170 so that the NCB performs its blocking operation.

The network interface 182 is connected to the communication lines 107 of the subnet 102 in which the NCB 108 is located. As a result, it receives all of the packets 114 that are transmitted between the protected host computers 104-1 in the subnet and between the protected and remote host computers 104-1 and 104-2 outside of the subnet. These may be packets such as the connection packets 114-1 to 114-9 described earlier which are used in establishing, providing network services with, and closing connections between the host computers that are the endpoints of these connections.5

For each packet 114 that is received by the network interface 182, the network interface sends an interrupt to the network interface driver 168. In response, the network interface driver stores the packet in one of the buffers 184 that is available. The network interface driver then determines from the whether the packet has been sent to the NCB as an NCB management packet for managing the NCB 108 or is a packet transmitted between protected host computers 104-1 or between protected and remote host computers 104-1 and 104-2. Referring also to FIG. 3, this is done by determining whether the physical destination address 154 in the link layer header 150 of the packet contains the physical address of the NCB. If it does, then this means that the packet is an NCB management packet. In this case, the network interface driver passes the pointer to the buffer that stores the packet to the network protocol stack 230 of the NCB for further processing of the packet in the manner described later. However, if the physical destination address does not contain the physical address of the NCB, then this means that the packet is one of the connection packets 114-1 to 114-9 and the network interface driver places (i.e., stores) the corresponding pointer to the buffer that stores the packet in the queue 186. Then, the packet is processed by the blocking controller 170 in the following manner.

The blocking controller 170 processes the packets 114 that are connection packets 114-1 to 114-9 in the order in which the pointers to the corresponding buffers 184 are placed in the queue 186. For each packet 114 that is placed in the queue, the blocking controller 170 retrieves and removes from the queue the pointer to the buffer that stores the packet when all of the preceding pointers in the queue have been removed from the queue and the packets that are stored in the buffers pointed to by the preceding pointers have been processed. In other words, when the blocking controller has finished processing a packet stored in a buffer pointed to by a preceding pointer in the queue, the blocking controller then removes this preceding pointer from the queue and retrieves the next pointer from the queue. The blocking controller then processes the packet that is stored in the buffer pointed to by this next pointer. This is done in the manner described next.

In processing each packet 114 that is one of the connection packets 114-1 to 114-9, the blocking controller 170 obtains the network addresses of the client and the server from the source and destination network addresses 144 and 146 in the network layer header 142 and the service access addresses of the client and the server in the source and destination service access addresses 124 and 126 in the transport layer header 122. This is done using the pointer that points to the buffer 184 that stores the packet. As indicated earlier, the obtained network addresses and service access addresses of the client and server comprise a connection information set that identifies the connection between the client and the server. More specifically, it identifies the connection's endpoints and the application layer protocol used in the connection. The blocking controller then determines whether to block this connection by determining from the connection information set whether the connection satisfies the blocking policy stored by the blocking data structure 192.

Figures 9, 10, 13:
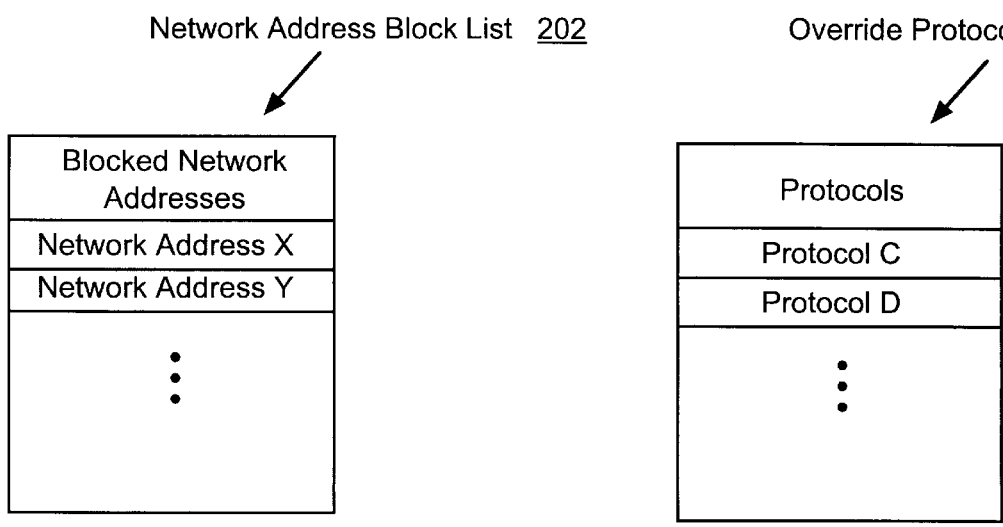
FIG. 9 shows a blocking mode table that is included in the blocking data structure of the network connection blocker.
FIG. 10 shows a network address block list that is included in the blocking data structure of the network connection blocker.
FIG. 13 shows an override protocol list that is included in the blocking data structure of the network connection blocker.

In order to do this, each protected host computer 104-1 in the protected subnet 102-1 is assigned a blocking mode. The blocking modes that may be assigned to each protected host computer include a screened mode, a restricted mode, an open mode, and a network shutdown mode. These blocking modes will be explained later in greater detail. The blocking data structure 192 includes a blocking mode table 200 that identifies the blocking mode assigned to each of the protected host computers in the protected subnet. As shown in FIG. 9, the blocking mode table lists the network address of each protected host computer and the corresponding blocking mode for the host computer.

The blocking data structure 192 also includes a network address block list 202 that identifies the network address blocking policy for all of the protected host computers 104-1 that have been assigned the screened mode. As shown in FIG. 10, the network address block list is a list of the network addresses of the protected and remote host computers 104-1 and 104-2 for which a connection will be blocked if it has an endpoint at one of these host computer and an endpoint at one of the protected host computers that has been assigned the screened mode. However, as will be explained later, such a block may be overridden with the blocking override table 208 of the blocking data structure.

Additionally, the blocking data structure 192 includes a remote protocol block list 204 and a local protocol block list 206 that identify the remote and local protocol blocking policies for all of the protected host computers 104-1 that have been assigned the screened mode. As shown in FIG. 11, the remote protocol block list is a list of the application layer protocols for which a connection will be blocked if it uses one of these application layer protocols and has an endpoint at a remote host computer 104-2 and an endpoint at a protected host computer 104-1 that has been assigned the screened mode. Similarly, the local protocol block list is a list of the application layer protocols for which a connection will be blocked if it uses one of these application layer protocols and has endpoints at a pair of protected host computers with at least one of the protected host computers having been assigned the screened mode. Here again, these protocol blocking policies may be overridden with the blocking override table 208.

For certain protected host computers 104-1 that are assigned the screened mode, the blocking override table (or matrix) 208 of the blocking data structure may identify a customized blocking override policy for each connection between one of these host computers and a corresponding protected or remote host computer 104-1 or 104-2. These blocking override policies override the network address and protocol blocking policies that are identified by the network address block list 202 and the remote and local protocol block lists 204 and 206 for all of the protected host computers in the subnet 102-1. As shown in FIG. 12, the blocking override table identifies the network addresses of the protected host computers. And, it identifies the network address of each protected and remote host computer for which a corresponding blocking override policy has been created for a connection between it and a corresponding protected host computer. Thus, for each protected host computer and a corresponding protected or remote host computer for which a blocking override policy has been created for a connection between them, the blocking override table identifies the blocking override policy.

Each override blocking policy comprises a set of override type ID (identifier) bits and a set of protocol blocking ID bits. The set of override type ID bits specify the type of override blocking policy that is to be used for the corresponding connection. The types of override blocking policies that may be identified include (1) inactive such that the blocking policy for the connection is according to the network address block list and the remote and local protocol block lists, (2) allow such the override blocking policy is active and the connection should be allowed, (3) block such that the override blocking policy is active and the connection should be blocked, and (4) selective protocol block such that the override blocking policy is active and the connection should be blocked if the set of protocol blocking ID bits identify an application layer protocol that is to be blocked if it is being used in the connection.

The set of protocol blocking ID bits comprises a set of protocol list ID bits that identify one of a number of override protocol lists 210 in the blocking data structure. As shown in FIG. 13, each override protocol list is a customized list of certain selected application layer protocols so that each override protocol list may include a different set of application layer protocols than the other override protocol lists.

The set of protocol blocking ID bits also comprises a set of protocol blocking bits with a corresponding bit for each application layer protocol in the protocol list identified by the set of protocol blocking ID bits. Each protocol blocking bit indicates whether the corresponding application layer in the identified protocol list should be blocked or not.

Furthermore, the blocking data structure 192 includes a network address access list 212 that identifies the network address access policy for all of the protected host computers 104-1 that have been assigned the restricted mode. As shown in FIG. 13, the network address access list is a list of the network addresses of the protected and remote host computers 104-1 and 104-2 for which a connection will only be allowed if it has an endpoint at one of these host computers and an endpoint at one of the protected host computers that has been assigned the restricted mode.

Therefore, for each packet 114 from which a connection information set has been obtained, the blocking controller 170 determines whether to block the connection based on the connection information set and the blocking data structure 192. This is done in the following manner using the blocking mode table 200, the network address block list 202, the remote and local protocol block lists 204 and 206, the override table 208, the override protocol lists 210, and the network address access list 212 of the blocking data structure and the source and destination network addresses and the source and destination service access addresses 124 and 126 in the connection information set.

For each packet 114 from which a connection information set has been obtained, the blocking controller 170 first determines if the source network address 144 is listed in the blocking mode table 200. If the blocking controller determines that the source network address is in the blocking mode table, then this means that the connection has an endpoint at a protected host computer 104-1 with the source network address. In this case, the blocking controller then uses the source network address to obtain the blocking mode for the protected host computer from the blocking mode table and determines whether to block the connection based on the blocking mode in the manner to be described shortly. If the blocking controller determiners that the connection should be blocked for the protected host computer with the source network address, then it causes the protected host computer to close the endpoint of this connection at this protected host computer in the manner also to be described shortly.

But if the blocking controller 170 determines that the source network address 144 is not in the blocking mode table 200, then this means that the connection has an endpoint at a remote host computer 104-2 with the source network address. When this occurs, the blocking controller 170 determines whether the destination network address 146 is in the blocking mode table. If the destination network address is not in the blocking mode table, then this means that the connection has another endpoint at a remote host computer with the destination network address. Since the connection is between two remote host computers, the connection is allowed and the blocking controller will not cause the connection to be blocked.

Similarly, if the blocking controller 170 determines that the source network address 144 is in the blocking mode table 200 but the connection is allowed for the protected host computer 104-1 with the source network address, it then determines whether the destination network address 146 is in the blocking mode table. As mentioned earlier, if the destination network address is not in the blocking mode table, then this means that the connection has an endpoint at a remote host computer with the destination network address. Thus, the connection is allowed and the blocking controller will not cause the connection to be blocked.

But, if the destination network address 146 is in the blocking mode table 200, then the connection has an endpoint at a protected host computer 104-1 with the destination network address. In this case, the blocking controller then obtains the blocking mode for the protected host computer from the blocking mode table and determines whether to block the connection based on the blocking mode. If the blocking controller determiners that the connection should be blocked, then it causes the host computer with the source network address 144 to close the endpoint of this connection at this host computer. Otherwise, the connection is allowed and the blocking controller will not cause the connection to be blocked.

As just described, when the blocking controller 170 obtains the blocking mode for a protected host computer 104-1 with a source or destination network address in a connection information set, it determines whether to block the connection for which this connection information was obtained. This is done as follows.

If the blocking mode for this protected host computer 104-1 is the screened mode, then the blocking controller first determines if there is a blocking override policy for the connection. This is done by using the source and destination network addresses in the connection information set for the connection to reference into the blocking override table 208 to locate a blocking override policy for the connection. Here, one of the source and destination network addresses is the network address of the protected host computer at which is one endpoint of the connection and the other is the network address of the other host computer at which is the other endpoint of the connection.

If the blocking override policy in the blocking override table 208 identifies the allow type of blocking override policy, then the connection is allowed for the protected host computer 104-1. In this case, the blocking controller 170 will not cause the connection to be blocked.

Conversely, if the blocking override policy in the blocking override table 208 identifies the block type of blocking override policy, then the connection will be blocked. The blocking controller in this case will cause the host computer with the source network address in the connection information set for the connection to close the endpoint of this connection at this host computer.

Moreover, if the blocking override policy in the blocking override table 208 identifies the selective protocol block type of blocking override policy, then the connection will be blocked if the blocking override policy also identifies an application layer protocol that is to be blocked which is used in the connection. This is done by determining if either of the source or destination service access addresses 124 and 126 in the connection information set for the connection identify the well known service access address for an application layer protocol that the override blocking policy indicates should be blocked.

However, it may be the case that the blocking controller 170 cannot reference into the blocking override table 208 because there is no blocking override policy for the connection between this protected host computer 104-1 and the other host computer 104-1 or 104-2 in the blocking override table. Furthermore, the blocking override policy may identify the inactive type of blocking override policy. In either of these cases, the blocking controller 170 then determines whether the connection should be blocked based on the network address blocking policy in the network address block list 202. In order to do so, the blocking controller determines whether the source or destination network address 144 or 146 in the connection information set which is the network address of the other host computer is in the network address block list. If it is, then this means that the connection is to be blocked.

However, if the blocking controller determines that the source or destination network address 144 or 146 in the connection information set which is the network address of the other host computer 104-1 or 104-2 is not in the network address block list, then it determines if the application layer protocol used in the connection is in one of the remote or local protocol block lists 204 or 206. It does so by first determining whether the other host computer is a protected host computer 104-1 by determining if the one of the source and destination network addresses which is the network address of the other host computer is in the blocking mode table. If it is, then this means that the other host computer is a protected host computer 104-1. But, if it is not, then this means that the other host computer is a remote host computer 104-2.

If the other host computer 104-1 or 104-2 is a protected host computer 104-1, then the connection is between two protected host computers. The blocking controller 170 then determines whether the application layer protocol used in the connection is listed in the local protocol block list 206. Similar to the override blocking table 208, this is done by determining if either of the source or destination service access addresses 124 and 126 in the connection information set for the connection identify the well known service access address for an application layer protocol that is listed in the local protocol block list. If it is not, then the connection will not be blocked. But, if it is, then the connection is to be blocked.

Similarly, if the other host computer 104-1 or 104-2 is a remote host computer 104-2, then the connection is between a protected host computer and a remote host computer. The blocking controller then determines whether the application layer protocol used in the connection is listed in the remote protocol block list 204. Again, this is done by determining if either of the source or destination service access addresses 124 and 126 in the connection information set for the connection identify the well known service access address for an application layer protocol that is listed in the local protocol block list. If it is not, then the connection will not be blocked. But, if it is, then the connection is to be blocked.

However, if the blocking controller 170 initially determines that the blocking mode for the protected host computer 104-1 is the restricted mode, then the blocking controller determines whether the connection should be allowed based on the network address access policy in the network address access list 212. In order to do so, the blocking controller determines whether the source or destination network address 144 or 146 in the connection information set which is the network address of the other host computer is in the network address access list. If it is, then this means that the connection is to be allowed. But, if it is not, this means the connection is to be blocked.

The blocking controller 170 may also initially determine that the blocking mode for the protected host computer 104-1 is the open mode or the shutdown mode. In this case of the open mode, the connection is to be allowed. But, in the case of the shutdown mode, the connection is to be blocked.

In processing each received packet 114 for which a connection information set is obtained, the blocking controller 170 generates a connection reset packet for causing the connection to be reset (i.e., closed) if the blocking controller determines from the connection information set that the connection is to be blocked. For example, if the TCP/IP protocol suite is being used, then this connection reset packet may be the connection reset packet 114-9 described earlier and shown in FIG. 5. In generating this connection closing packet, the blocking controller uses the received packet stored as a template. Thus, it uses the pointer to the buffer that stores the received packet to access the received packet and set the flags in the packet's transport layer header 122 to include the reset flag. It also switches the source and destination network addresses 144 and 146 in the packet's network layer header 142, switches the source and destination service access addresses 124 and 126 in the packet's transport layer header, and switches the source and destination physical addresses 152 and 154 in the packet's link layer header 150. Additionally, if the received packet was the first connection establishing packet 114-1, then the blocking controller sets the acknowledge number 130 in the transport layer header to be equal to the sequence number 128 in the first connection establishing packet's transport layer header. But, if the packet received from the client is one of the other packets 114-2 or 114-5, the blocking controller sets the sequence number 128 in the connection reset packet's transport layer header to be equal to the acknowledge number in the received packet's transport layer header.

The blocking controller 170 then passes to the network interface driver 168 the pointer to the buffer 184 that stores the connection reset packet 114 and instructs the network interface driver to have the connection reset packet transmitted. In response, the network interface driver retrieves the connection reset packet from the buffer and passes it to the network interface 182 and instructs the network interface to transmit it. The network interface then does transmit the connection reset packet. Since the source and destination network addresses 144 and 146, the source and destination service access addresses 124 and 126, and the source and destination physical addresses 152 and 154 have been switched, the transmitted packet is received by the host computer 104-1 or 104-2 that transmitted the received packet 114 that was the template for generating the connection reset packet.

Figure 14:
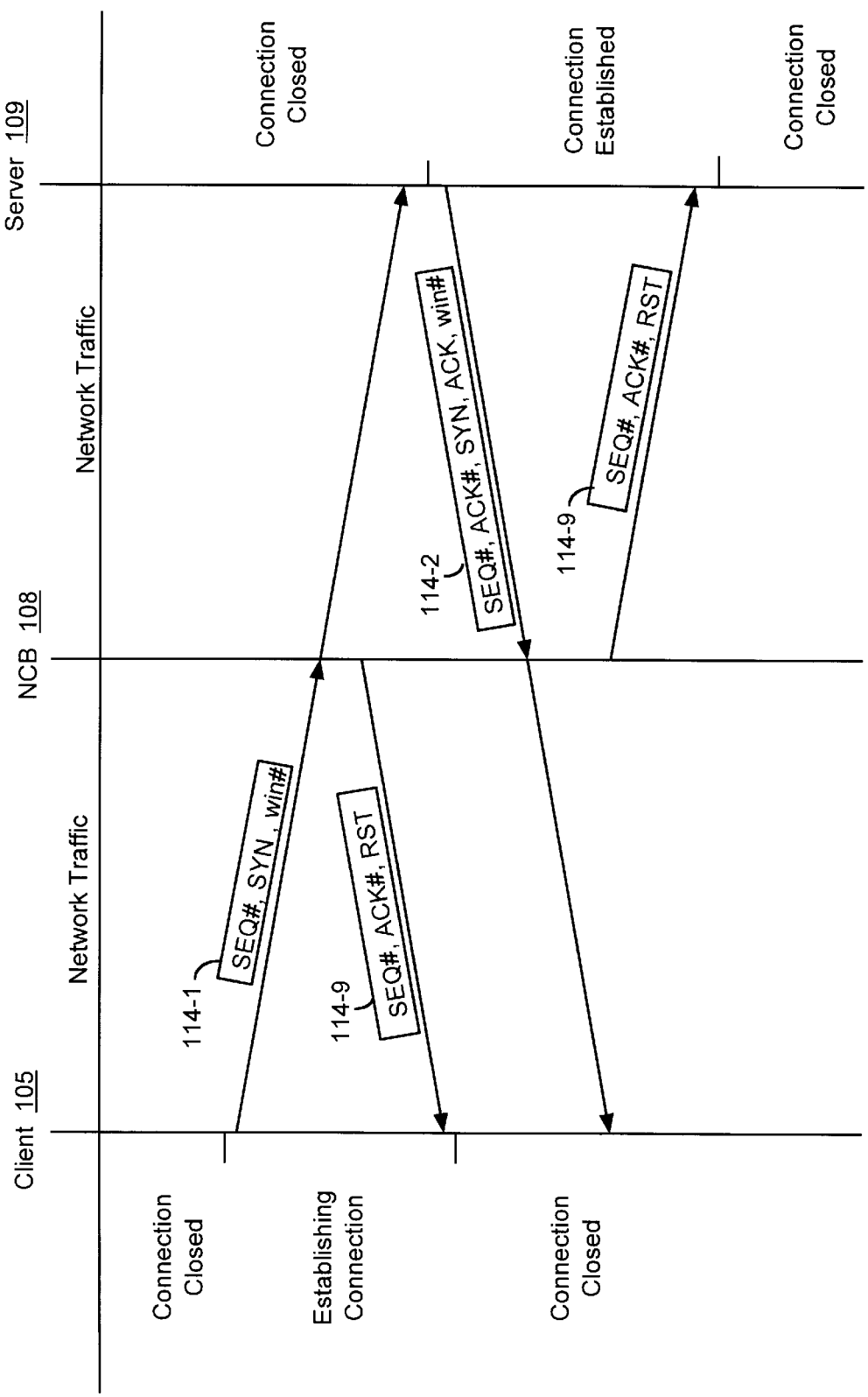
FIG. 14 shows how a connection is blocked by the network connection blocker according to the TCP protocol.

FIG. 14 shows how a connection between host computers 104 that are a client 105 and a server 109 is closed by the NCB 108 using the reset flag according the TCP protocol. Here, the client transmits a first connection establishing packet 114-1 and moves from the connection closed state to the connection establishing state in the manner described earlier for FIG. 4. Then, the NCB 108 receives and process this packet and generates in response a connection reset packet 114-9 in the manner just described. The connection reset packet is transmitted to the client which then closes the endpoint of the connection at the client and moves from the connection establishing state to the connection closed state in the manner described earlier for FIG. 5.

However, the first connection packet 114-1 will still have been received by the server 109. In response, the server transmits a second connection establishing packet 114-2 and moves from the connection closed state to the connection establishing state in the manner described for FIG. 4. The NCB 108 will also receive and process this second connection establishing packet and generate another connection reset packet 114-9 in the manner just described. The connection reset packet is transmitted to the server which closes the endpoint of the connection at the server and the server moves from the connection establishing state to the connection closed state in the manner described earlier for FIG. 5. Thus, the connection is now completely closed.

Furthermore, as those skilled in the art will recognize, the connection reset packets may be generated in response to any packet transmitted between the server and the client. For example, the NCB 108 may be turned on in the middle of a connection between the client and the server. Thus, for example, the first packet received by the NCB that is transmitted between the client and the server may be the second connection establishing packet 114-2 transmitted by the server. In this case, the NCB process the second connection establishing packet and generates a connection reset packet 114-9 that is transmitted to the server. And, in response to receiving the third connection establishing packet 114-3 transmitted by the client in response to the second connection establishing packet, the NCB process the third connection establishing packet and generates a connection reset packet that is transmitted to the client. In this way, the connection is completely closed as well.

Remote Management

Referring to FIG. 1, the NCB 108 may be managed remotely from one of the host computers 104. This host computer may be one of the protected host computers 104-1 or one of the remote host computers 104-2. This is done with packets 114 transmitted between the NCB and this host computer to perform management operations of the NCB.

Figure 15:
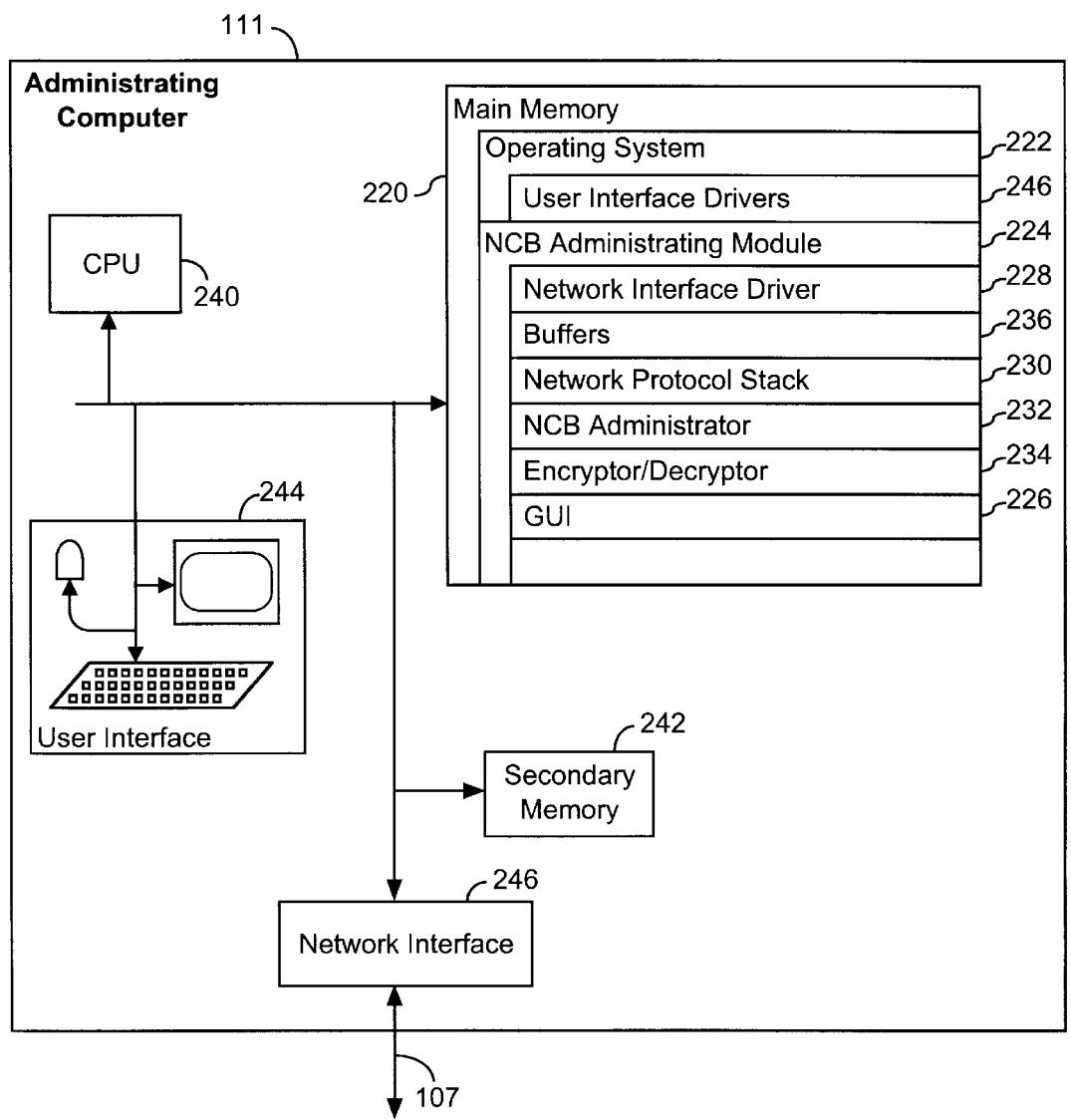
FIG. 15 shows an administrating computer for remotely managing the network connection blocker.

FIG. 15 shows an administrating computer 111 that is one of the host computers 104 and is capable of remotely managing the NCB 108. This administrating computer includes a main memory system 220 that stores an operating system 222 and an NCB administrating module 224. The administrating module comprises a set of routines including a GUI 226, a network interface driver 228, a network protocol stack 230, an NCB administrator 232, and an encryptor 234. The operating system and the routines of the NCB administrating module are run on the CPU 240 of the administrating computer and may be loaded from its secondary memory system 242. The operating system controls and coordinates running of the routines of the NCB administrating module.

Figure 16:
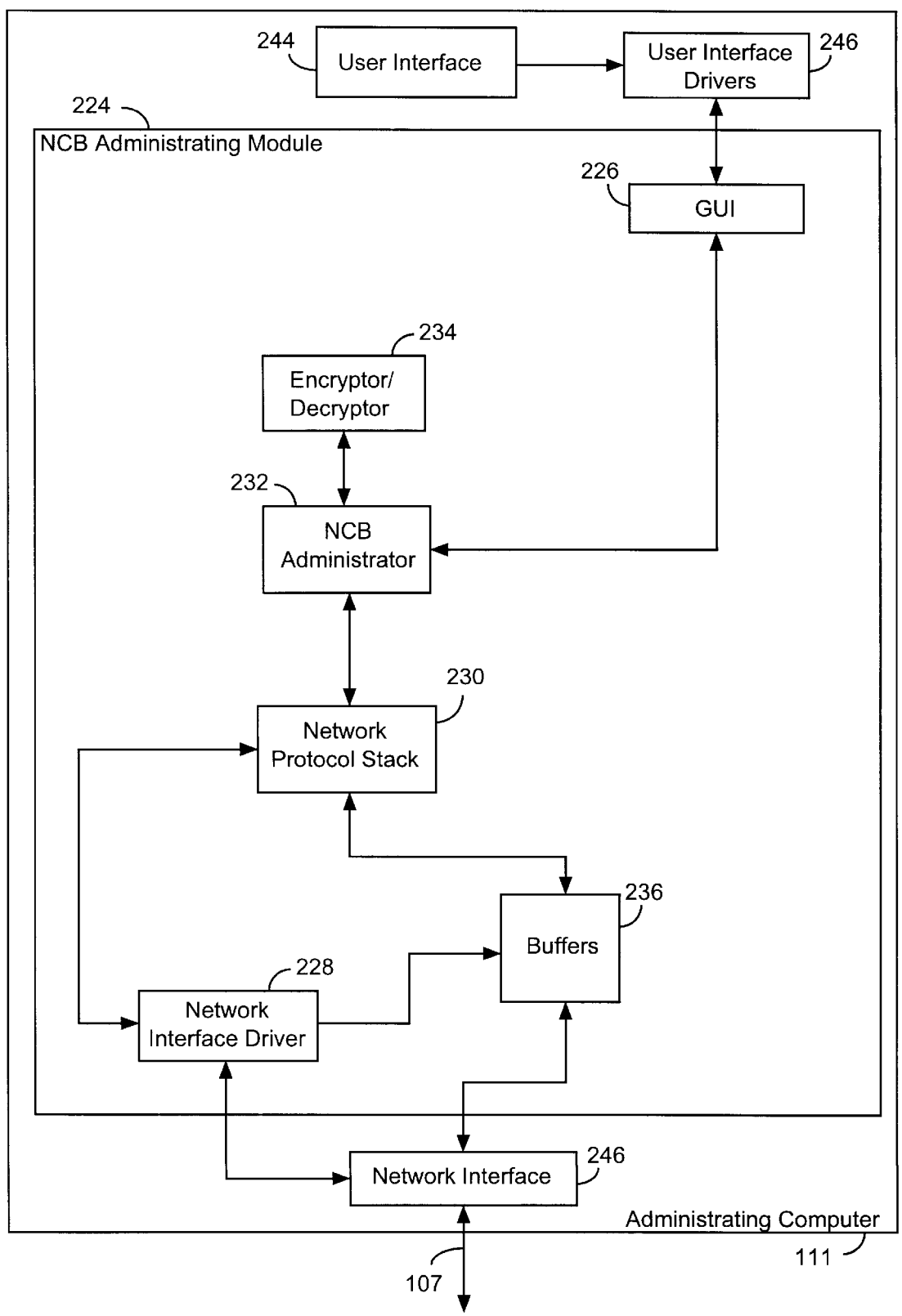
FIG. 16 shows the operation of the administrating computer.

Referring now to FIG. 16, the GUI 226 of the NCB administrating module 224 is displayed by the user interface 244 of the administrating computer 111. In order to manage the NCB 108 remotely from the administrating computer, the user issues commands with the user interface and the GUI to run the NCB administrating module. The user interface drivers 246 of the operating system 222 receive these commands and provide them to the GUI. The GUI then opens the NCB administrator 232. The administrating user then issues commands with the user interface and the GUI to remotely perform management operations on the NCB with the NCB administrator.

Referring to FIG. 3, in response to one of these commands, the NCB administrator 232 generates application layer data 136 for a first management packet 114 to be transmitted to the NCB 108. The application layer data 136 includes a management information set for implementing the management operation specified by the command.

For example, the administrating user may generate a command to read a particular item from, delete a particular item in, or write a particular item into the blocking mode table 200, the network address block list 202, the remote and local protocol block lists 204 and 206, the override table 208, the override protocol lists 210, and the network address access list 212 of the blocking data structure 192 of the NCB 108. In this case, the management information set in the application layer data will indicate whether a read, delete, or write of an item is to occur and will identify the list or table. Furthermore, the management information set in the application layer data will identify any network addresses of the host computers 104 needed to reference into the list or table and, in the case of a write, will include the item that is being written.

Or, the command may be to read from or write to the blocking data structure 192 the entire contents of one or more of the blocking mode table 200, the network address block list 202, the remote and local protocol block lists 204 and 206, the override table 208, the override protocol lists 210, or the network address access list 212. In this case, the management information set in the application layer data 136 will indicate whether a read or write of the table or list is to occur and will identify the list or table. Furthermore, in the case of a write, the management information set in the application layer data will include the list or table that is being written.

Furthermore, the command may be to read a particular item from, delete a particular item in, or write a particular item into the configuration parameters 189 of the NCB blocking module 164 of the NCB or to write to or read from the NCB blocking module the entire configuration parameters. The configuration parameters include the network address of the NCB, a list of the network address of each administrating computer 111, and a table of encryption keys and their corresponding key numbers. In this case, the management information set in the application layer data 136 will indicate whether a read, delete, or write of an item is to occur and will identify the item or will indicate that a read or write of the entire contents of the configuration parameters is to occur. Furthermore, the management information set in the application layer data will, in the case of a write, contain the item to be written or the entire contents of the configuration parameters to be written.

The application layer data 136 generated by the NCB administrator 232 also includes a clear text (i.e., unencrypted) version of a digital signature of the administrating computer 111, an encrypted version of the digital signature, a clear text version of the corresponding key number of an encryption key, and an encrypted version of the key number. The digital signature may simply be a random number generated by the NCB administrator 232. The encrypted key number of the encryption key and the digital signature are encrypted with the encryption key. This is done by the encryptor/decryptor 234 of the NCB administrating module 224 which is called up by the NCB administrator and stores the same key table that is stored by the configuration parameters in the NCB blocking module 164. The encryption may be done according to well known DES encryption techniques.

The NCB administrator 232 then calls the network protocol stack 230 of the NCB administrating module 224 for generating the first management packet 114 in accordance with a network protocol suite 116 for transmitting NCB management packets. This packet is stored in one of the buffers 236 of the NCB administrating module. In doing so, the network protocol stack first attaches the application layer data 136 to the packet in accordance with the application layer protocol 118.

The network protocol stack 230 then attaches the transport layer header 122 to the first management packet 114 in accordance with the transport layer protocol 119 used for transmitting NCB management packets. Here, the source service access address 124 is a chosen service access address of the administrating computer 111 and the destination service access address 126 is a predefined service access address for the NCB manager 188 of the NCB 108. However, the transport layer protocol may be a connectionless oriented protocol, such as UDP, so that the acknowledge number 130, sequence number 128, window number 134, and flags 132 are not needed.

The network protocol stack also attaches a network layer header 142 to the first management packet 114 in accordance with the network layer protocol 120. The source network address 142 is the network address of the administrating computer 111, the destination network address 144 is the network address of the NCB 108, and the network protocol ID specifies the network layer protocol 120.

Finally, the network protocol stack 230 attaches a link layer header 150 and trailer 158 to the first management packet 114 in accordance with the link layer protocol 120. In the link layer header, the source physical address 152 is the physical address of the administrating computer 111, the destination physical address 154 is the physical address obtained from the routing information stored by the network protocol stack, and the transport protocol ID 156 specifies the transport layer protocol 119.

The network protocol stack 230 then passes to the network interface driver 228 the pointer to the buffer 236 that stores the first management packet 114 and instructs the network interface driver 228 to have the packet transmitted. In response, the network interface driver retrieves the packet from the buffer and passes it to the network interface 246 of the administrating computer 111 and instructs the network interface to transmit it. The network interface then transmits the packet to the NCB 108.

Figure 17:
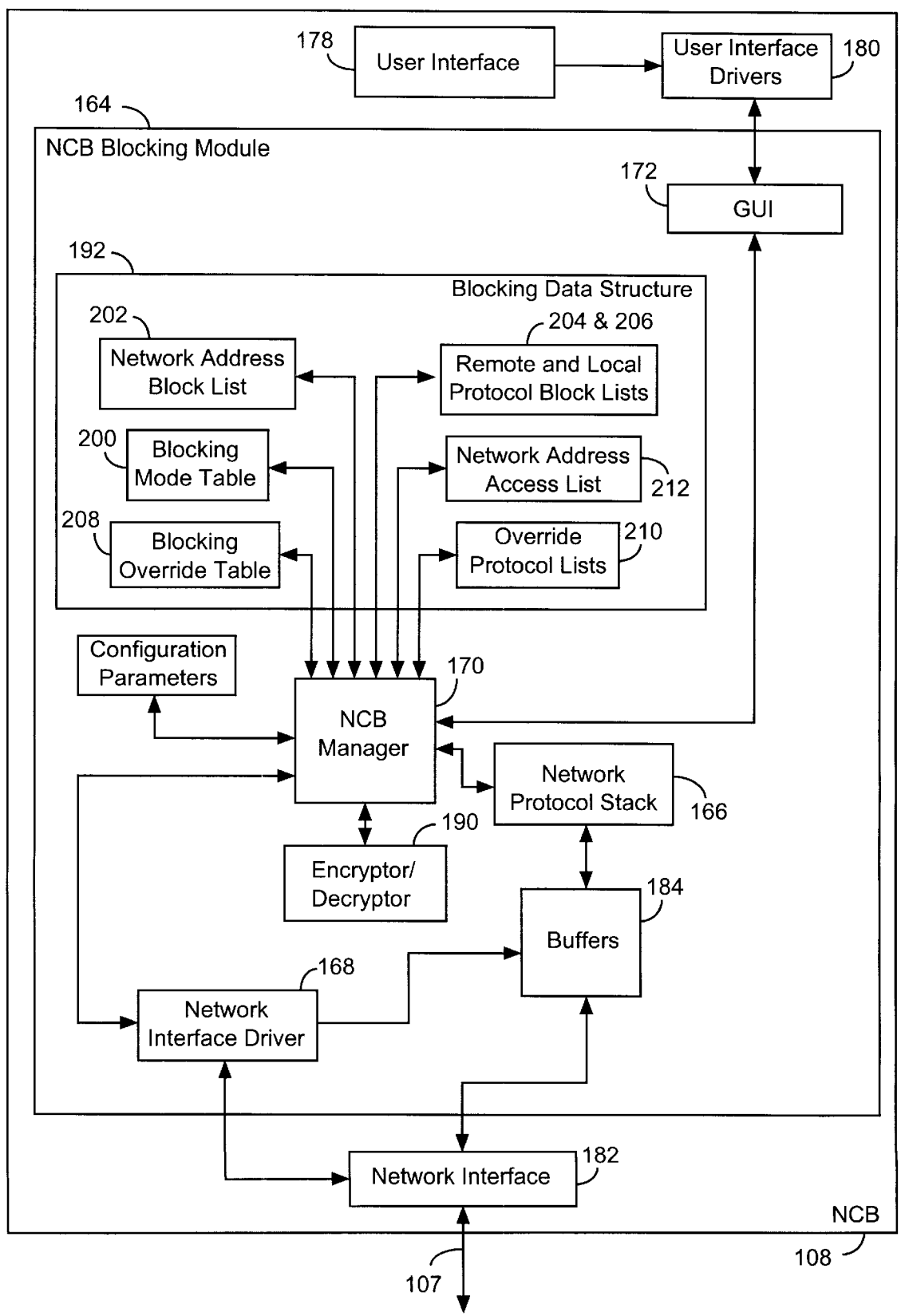
FIG. 17 shows the operation of the network connection blocker while being remotely managed by the administrating computer.

Referring to FIG. 17, as indicated earlier, the network interface 182 of the NCB 108 receives all of the packets 114 that are transmitted over the communication lines 107 of the protected subnet 102-1. In the manner described earlier, each packet is received by the network interface 168 and the network interface driver 182 then determines whether the packet has been sent to the NCB 108 as an NCB management packet for managing the NCB 108 or is a packet transmitted between protected host computers 104-1 or between protected and remote host computers 104-1 and 104-2. This again is done by determining whether the physical destination address 154 in the link layer header 150 of the packet contains the physical address of the NCB. If it does, then this means that the packet is an management packet. In this case, the network interface driver passes the pointer to the buffer that stores the packet to the network protocol stack 166 of the NCB.

The network protocol stack 166 then determines whether the destination network address 146 in the network layer header 142 of the received first management packet 114 is the network address of the NCB 108 given by the configuration parameters 189 in the NCB blocking module 164. If it is not, then no further processing of the packet occurs. However, if it is the NCB's network address, then the network protocol stack obtains the destination service access port 126 in the packet's transport layer header 122 and calls the NCB manager 188. The NCB manager then calls the decryptor/encryptor 190 in the NCB blocking module to decrypt the encrypted versions of the digital signature and key number in the application layer data 136 of the packet. This is done by using the encryption key in the configuration parameters 189 of the NCB blocking module 164 that corresponds to the clear text version of the key number in the application layer data 136 of the packet. Then, the NCB manager compares the decrypted digital signature and key number with the clear text versions of the digital signature and key number to determine whether they are the same. If they are not, then no further processing of the packet occurs.

However, if they are the same, then the NCB manager performs on the NCB the management operation identified by the management information set in the application layer data. This management operation is one of the management operations described earlier.

Once the management operation has been performed, the NCB manager 188 generates application layer data 136 that contains a result information set. In the case where the management information set in the application layer data 136 indicates that an item in one of the lists or tables 200, 202, 204, 206, 208, 210, or 212 or in the configuration parameters 189 is to be written or deleted or the entire contents of one or more of these lists or tables or the entire contents of the configuration parameters is to be written, the result information set indicates that the management operation was performed. However, in the case where the management information set in the application layer data indicates that an item in one of the lists or tables or in the configuration parameters is to be read or the entire contents of one or more of these lists or tables or the entire contents of the configuration parameters is to be read, the result information set indicates not only the management operation was performed but also includes what is being read.

In each of the cases just described, the application layer data 136 also contains the clear text and encrypted versions of the digital signature of the NCB, and the clear text and encrypted versions of the key number used in the encryption. Here, the NCB manager 188 calls the encryptor/decryptor 190 to perform the encryption of the digital signature and the key number.

The NCB manager 188 then instructs the network protocol stack 166 of the NCB to generate a second management packet 114 stored in one of the buffers 184 for transmitting the result information set to the administrating computer. The network protocol stack then generates the second management packet in a similar manner to the way in which the first management packet was generated by the network protocol stack 230 of the administrating computer 111 by attaching to the packet the application layer data 136, a network layer header 142, a transport layer header 122, and a link layer header 150 and a link layer trailer 158. Here, however, the source and destination network addresses 144 and 146 are switched and so are the source and destination service access addresses 124 and 126. Moreover, the source physical address 144 is the physical address of the NCB and the destination physical address and 146 is obtained from the routing information of the network protocol stack.

The network protocol stack 166 then passes to the network interface driver 168 the pointer to the buffer 184 that stores the second management packet 114 and instructs the network interface driver to have the packet transmitted. In response, the network interface driver retrieves the packet from the buffer and passes it to the network interface 182 of the NCB 108 and instructs the network interface to transmit it. The network interface then transmits the packet to the administrating computer 111.

Referring to FIG. 16, the network interface 246 of the administrating computer 111 receives the second management packet 114 over the communication lines 107 of the subnet 102 that it is on and sends an interrupt to the network interface driver 228 indicating that this has occurred. The network interface driver then stores the packet in one of the buffers 236 and determines whether the physical destination address 154 in the link layer header 150 of the packet contains the physical address of the administrating computer. If it does not, then processing of the packet stops. But, if it does contain the physical address of the administrating computer, the network interface driver then passes the pointer to the buffer that stores the packet to the network protocol stack 230 of the administrating computer.

The network protocol stack 230 then determines if the destination network address 146 in the network layer header 142 of the received second management packet 114 is the network address of the administrating 108 given by the configuration parameters 189 in the NCB blocking module 164. If it is not, then no further processing of the packet occurs. However, if it is the administrating computer's network address, then the network protocol stack obtains the destination service access port 126 in the packet's transport layer header 122 and in response calls the NCB administrator 232. The NCB administrator then calls the decryptor/encryptor 234 in the NCB blocking module to decrypt the encrypted versions of the digital signature and key number in the application layer data 136 of the packet. This is done by using the encryption key stored by the encryptor/decryptor that corresponds to the clear text version of the key number in the application layer data 136 of the packet. Then, the NCB manager compares the decrypted digital signature and key number with the clear text versions of the digital signature and key number to determine whether they are the same. If they are not, then no further processing of the packet occurs. However, if they are the same, then the NCB administrator processes the result information set from the packet.

In the case where the result information set in the application layer data 136 confirms that an item in one of the lists or tables 200, 202, 204, 206, 208, 210, or 212 or in the configuration parameters 189 was written or deleted or the entire contents of one or more of these lists or tables or the entire contents of the configuration parameters was written, the NCB administrator causes the GUI 226 to display that this occurred successfully on the user interface 244 via the user interface drivers 246. Similarly, in the case where the result information set in the application layer data includes an item in one of the lists or tables or in the configuration parameters that was read or includes the entire contents of one or more of these lists or tables or the entire contents of the configuration parameters that was read, the NCB administrator causes the GUI to display what was read on the user interface via the user interface drivers 246.

Local Management

Referring to FIG. 1, the NCB 108 may also be managed locally at the NCB. In order to do so, the user issues commands with the user interface 178 which displays the GUI 172 of the NCB blocking module 164. The user interface drivers 180 then provide these commands to the GUI. The GUI passes these commands to the NCB manager 188 which then manages the NCB blocking module in response to the commands. This is done in the same manner as was just described for managing the NCB remotely, except that the user interface, user interface drivers, and GUI of the NCB are used to generate the commands and display the results of the management operation.

Alternative Embodiments

In the embodiment of the NCB 108 described earlier for FIGS. 4 and where the TCP protocol is used as the transport layer protocol 119, the NCB generates connection reset packets 114-9 using the reset (RST) flag of the TCP protocol in response to receiving connection packets 114-1 to 114-9 for connections that are to be blocked. However, as those skilled in the art will recognize, the NCB could instead generate and transmit first connection closing packets 114-6 using the finish (FIN) flag of the TCP protocol.

Furthermore, the NCB 108 may be configured on a standard PC (personal computer) with a standard CPU 174, user interface 178, main memory system 160, secondary memory system 176, and network interface 182. In this case, the NCB blocking module 164 could be provided on and stored on a memory in the secondary memory system 176 of the PC. For example, the secondary memory system may comprise a hard disc drive with a hard disc that stores the NCB blocking module, or may comprise a floppy disc drive with a floppy disc that stores the NCB blocking module, or may comprise CD ROM disc drive with CD ROM disc that stores the NCB blocking module. And, for temporary storage of the NCB blocking module during execution by the CPU, the main memory system could comprise a RAM (random access memory) and, if desired, a cache.

Alternatively, the NCB 108 may be configured on a hardware platform optimized for the NCB. Specifically, the CPU 176 would comprise a microcontroller, such as the Motorola MC68360. The secondary memory system could comprise an EEPROM for storing the routines of the NCB blocking module 164, namely the network interface driver 166, the network protocol stack 168, the blocking controller 170, the encryptor/decryptor 190, the GUI 172, and the NCB manager 188. The main memory system could comprise a RAM (random access memory) for temporary storage of these routines, the buffers 184, and the input queue 186 during execution by the microcontroller. The main memory system could further comprise a CAM (content addressable memory) for storage of the blocking data structure 192 and the configuration parameters 189 of the NCB so that they can easily be accessed. Furthermore, the network interface 182 could comprise a standard network interface.

Conclusion

Much of the configuration and operation of the NCB is described in Omdahl, Svein-Tore, "Network Protocol Guard", Thesis for Masters of Science, Electrical and Computer Engineering Department, Iowa State University, 1996, which is hereby incorporated by reference. Moreover, while the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A network connection blocker for monitoring connections between host computers in a computer network and blocking unwanted ones of the monitored connections, the host computers transmitting monitored connection packets over the computer network that are addressed to each other and, in accordance with a connection oriented transport layer protocol, establish, provide network services with, and close the monitored connections, the network connection blocker comprising:

a central processing unit;

a network interface configured to receive the transmitted monitored connection packets over the computer network without blocking their reception by the host computers; and a blocking module running on the central processing unit and configured to (a) process the received monitored connection packets to detect the unwanted connections, and (b) generate blocking connection packets that are addressed to those of the host computers that have the detected unwanted connections therebetween and, in accordance with the connection oriented transport layer protocol, cause the detected unwanted connections to be closed by the host computers that have the unwanted connections therebetween;

the network interface being further configured to transmit the generated blocking connection packets over the computer network to the host computers that have the detected unwanted connections therebetween.

2. The network connection blocker of claim 1 further comprising a memory wherein the blocking module comprises:

a blocking data structure configured in the memory to store a connection blocking policy;

a blocking controller configured to (a) process the received monitored connection packets to detect the unwanted connections by (i) obtaining from the received monitored connection packets connection information sets that identify the monitored connections, and (ii) determining from the obtained connection information sets which ones of the monitored connections satisfy the stored connection blocking policy, and (b) generate the generated blocking connection packets.

3. The network connection blocker of claim 2 wherein:

the network interface is further configured to receive management packets over the computer network that are transmitted by an administrating one of the host computers;

the blocking module further comprises a manager configured to (a) process the received management packets to obtain management information sets from the received management packets, (b) perform management operations at the network connection blocker based on the obtained management information sets, and (c) generate management packets to provide results of the management operations to the administrating host computer;

the network interface is further configured to transmit the generated management packets over the computer network to the administrating host computer.

4. A method of monitoring connections between host computers in a computer network and blocking unwanted ones of the monitored connections, the host computers transmitting monitored connection packets over the computer network that are addressed to each other and, in accordance with a connection oriented transport layer protocol, establish, provide network services with, and close the monitored connections, the method comprising the steps of:

receiving the transmitted monitored connection packets over the computer network without blocking their reception by the host computers;

processing the received monitored connection packets to detect the unwanted connections;

generating blocking connection packets that are addressed to those of the host computers that have the detected unwanted connections therebetween and, in accordance with the connection oriented transport layer protocol, cause the detected unwanted connections to be closed by the host computers that have the unwanted connections therebetween; and transmitting the generated blocking connection packets over the computer network to the host computers that have the detected unwanted connections therebetween.

5. The method of claim 4 further comprising:

storing a connection blocking policy;

wherein the processing step includes:

obtaining from the received monitored connection packets connection information sets that identify the monitored connections; and determining from the obtained connection information sets which ones of the monitored connections satisfy the stored connection blocking policy.

6. The method of claim 5 further comprising the steps of:

receiving management packets over the computer network that are transmitted by an administrating one of the host computers;

processing the received management packets to obtain management information sets from the received management packets;

performing management operations at the network connection blocker based on the obtained management information sets; and generating management packets to provide results of the management operations to the administrating host computer; and transmitting the generated management packets over the computer network to the administrating host computer.

7. A computer readable memory for directing a computer in a computer network to monitor connections between host computers in the computer network and block unwanted ones of the connections, the host computers transmitting monitored connection packets over the computer network that are addressed to each other and, in accordance with a connection oriented transport layer protocol, establish, provide network services with, and close the monitored connections, the computer being configured to receive the monitored connection packets over the computer network without blocking their reception by the host computers and to transmit generated blocking connection packets over the computer network to those of the host computers that have the unwanted connections therebetween, the memory comprising:

a blocking module configured to (a) run on the computer, (b) process the received monitored connection packets to detect the unwanted connections, and (c) generate the generated blocking connection packets so that they are addressed to those of the host computers that have the detected unwanted connections therebetween and, in accordance with the connection oriented transport layer protocol, cause the detected unwanted connections to be closed by the host computers that have the unwanted connections therebetween.

8. The computer readable memory of claim 1 wherein the blocking module comprises:

a blocking data structure configured in the computer readable memory to store a connection blocking policy;

a blocking controller to (a) process the received monitored connection packets to detect the unwanted connections by (i) obtaining from the received connection packets connection information sets that identify the monitored connections, and (ii) determining from the obtained connection information sets which ones of the monitored connections satisfy the stored connection blocking policy, and (b) generate the generated blocking connection packets.

9. The computer readable memory of claim 8 wherein:

the computer is further configured to receive management packets over the computer network that are transmitted by an administrating one of the host computers and transmit generated management packets over the computer network to the administrating host computer; and the blocking module comprises a manager to (a) process the received management packets to obtain management information sets from the received management packets, (b) perform management operations at the network connection blocker based on the obtained management information sets, and (c) generate the generated management packets to provide results of the management operations to the administrating host computer.

10. The network connection blocker of claim 1 wherein the connection oriented transport layer protocol is the TCP protocol, the monitored connections are TCP connections, and the generated connection packets comprise reset packets containing the reset flag of the TCP protocol.

11. The network connection blocker of claim 1 wherein the connection oriented transport layer protocol is the TCP protocol, the monitored connections are TCP connections, and the generated connection packets comprise connection closing packets containing the finish flag of the TCP protocol.

12. The method of claim 4 wherein the connection oriented transport layer protocol is the TCP protocol, the monitored connections are TCP connections, and the generated connection packets comprise reset packets containing the reset flag of the TCP protocol.

13. The method of claim 4 wherein the connection oriented transport layer protocol is the TCP protocol, the monitored connections are TCP connections, and the generated connection packets comprise connection closing packets containing the finish flag of the TCP protocol.

14. The computer readable memory of claim 7 wherein the connection oriented transport layer protocol is the TCP protocol, the monitored connections are TCP connections, and the generated connection packets comprise reset packets containing the reset flag of the TCP protocol.

15. The computer readable memory of claim 7 wherein the connection oriented transport layer protocol is the TCP protocol, the monitored connections are TCP connections, and the generated connection packets comprise connection closing packets containing the finish flag of the TCP protocol.

\* \* \* \* \*